US007843614B2

(12) United States Patent
Iwago

(10) Patent No.: US 7,843,614 B2
(45) Date of Patent: Nov. 30, 2010

(54) IMAGE FORMING APPARATUS

(75) Inventor: Toshitaka Iwago, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 938 days.

(21) Appl. No.: 11/525,071

(22) Filed: Sep. 22, 2006

(65) Prior Publication Data

US 2007/0064252 A1 Mar. 22, 2007

(30) Foreign Application Priority Data

Sep. 22, 2005 (JP) ............................ 2005-276120

(51) Int. Cl.
*H04N 1/04* (2006.01)

(52) U.S. Cl. ...................... 358/498; 358/474; 358/497; 358/488; 399/367; 399/370; 399/374; 271/241; 271/207; 271/220

(58) Field of Classification Search ................ 358/474, 358/498, 497, 496, 486, 1.12, 488; 271/314, 271/225, 10.01, 4.01, 186, 272; 399/367, 399/370, 373, 374, 124, 125
See application file for complete search history.

(56) References Cited

U.S. PATENT DOCUMENTS

| | | | | |
|---|---|---|---|---|
| 5,430,536 | A * | 7/1995 | Fullerton et al. | 399/364 |
| 5,511,771 | A * | 4/1996 | Rubscha | 271/4.01 |
| 6,029,969 | A * | 2/2000 | Saitoh et al. | 271/4.02 |
| 6,209,861 | B1 * | 4/2001 | Kakuta et al. | 271/3.02 |
| 6,215,971 | B1 * | 4/2001 | Sakoh et al. | 399/159 |
| 6,285,852 | B1 * | 9/2001 | Etoh et al. | 399/367 |
| 6,585,258 | B1 * | 7/2003 | Hirota et al. | 271/186 |
| 6,674,983 | B2 * | 1/2004 | Enomoto et al. | 399/124 |
| 7,023,587 | B2 * | 4/2006 | Ikeda | 358/474 |
| 7,432,492 | B2 * | 10/2008 | Kikuchi | 250/208.1 |
| 2004/0089992 | A1 * | 5/2004 | Makino | 271/3.14 |
| 2004/0094887 | A1 * | 5/2004 | Hidaka et al. | 271/10.01 |
| 2004/0217537 | A1 * | 11/2004 | Ohama | 271/3.14 |

FOREIGN PATENT DOCUMENTS

| | | |
|---|---|---|
| JP | 7175279 | 7/1995 |
| JP | 2002182436 | 6/2002 |

* cited by examiner

*Primary Examiner*—Negussie Worku
(74) *Attorney, Agent, or Firm*—Banner & Witcoff, Ltd.

(57) ABSTRACT

An image forming apparatus includes a first unit configured to form an image, in a recording part, on a first surface of a recording medium being fed from a storing member for storing the recording medium, reverse the recording medium and feed it again to the recording part, form an image on a second surface of the recording medium, and eject the recording medium through an outlet; and a second unit disposed above the first unit. The second unit includes a first reading part, the first reading part being movable in a direction perpendicular to the direction of travel of the recording medium. The first unit and the second unit form a first space therebetween, and a length from a front end of the first unit to the outlet is greater than or equal to a length of a maximum sized recording medium capable of being stored in the storing member.

12 Claims, 23 Drawing Sheets

IMAGE FORMING APPARATUS

CROSS REFERENCE TO RELATED APPLICATIONS

This application claims priority from the Japanese Patent Application No. 2005-276120 filed on Sep. 22, 2005, the entire subject matter of which is incorporated herein by reference.

FIELD

Illustrated aspects of the invention relate to image forming apparatus suited for double-sided reading and printing of documents.

BACKGROUND

For image forming or printing on both sides of a recording medium, the recording medium can be inverted by reversing the direction of travel of the recording medium after the front side has been printed.

For image reading or scanning on both sides of a document, the document can be inverted by reversing the direction of travel of the document after the front side has been read.

Providing an apparatus with an image formation part, an auto feed reading part, and a stationary reading part, typically results in upsizing of the image forming apparatus.

To read or scan images printed on both sides of the document, the document can be inverted by reversing the direction of travel of the document after the front side has been read, as described above. In some apparatus, the direction of travel of the document is reversed by temporarily ejecting the document, after one side has been scanned, to an output tray intended for documents that have completed scanning, and then retracting the document back inside. If the user is located near the ejection side of the output tray, the document is ejected toward the user when the document is temporarily ejected to the output tray for reversing the direction of travel of the document. Thus, the user may erroneously assume that reading of both sides of the document is completed, and may pick up the document ejected to the output tray by mistake.

If a single-sided reading is sufficient but a double-sided reading is selected by mistake, the double-sided reading is cancelled by forcibly picking up the document when a single side reading is completed and the document is ejected. In some apparatus, the document is ejected to the output tray disposed under the input tray. The input tray then blocks the user from forcibly picking up the ejected document.

To form or print images on both sides of a recording medium, the direction of travel of the recording medium needs to be reversed after completing image formation on the front side, as described above. However, if the direction of travel of the recording medium is temporarily reversed after the recording medium is ejected outside the image reading apparatus, the user may erroneously assume that all image formation is completed, and may pick up the ejected recoding medium by mistake.

SUMMARY

Aspects of the invention provide an image reading apparatus for double-sided reading, scanning, and/or image forming that avoids increasing the size of the apparatus.

BRIEF DESCRIPTION OF THE DRAWINGS

Aspects of the invention will be described in detail with reference to various example structures and the following figures, wherein.

DETAILED DESCRIPTION

Illustrative aspects of the present invention will be described with suitable reference to the accompanying drawings. These aspects merely provide examples of the invention, and it is needless to say that the aspects can be suitably modified without departing from the gist of the invention General construction of image forming apparatus in accordance with an illustrative embodiment.

An image forming apparatus includes an electrophotographic image forming part (laser printer) 100 and an image reading part (scanner) 200.

Figure 1:
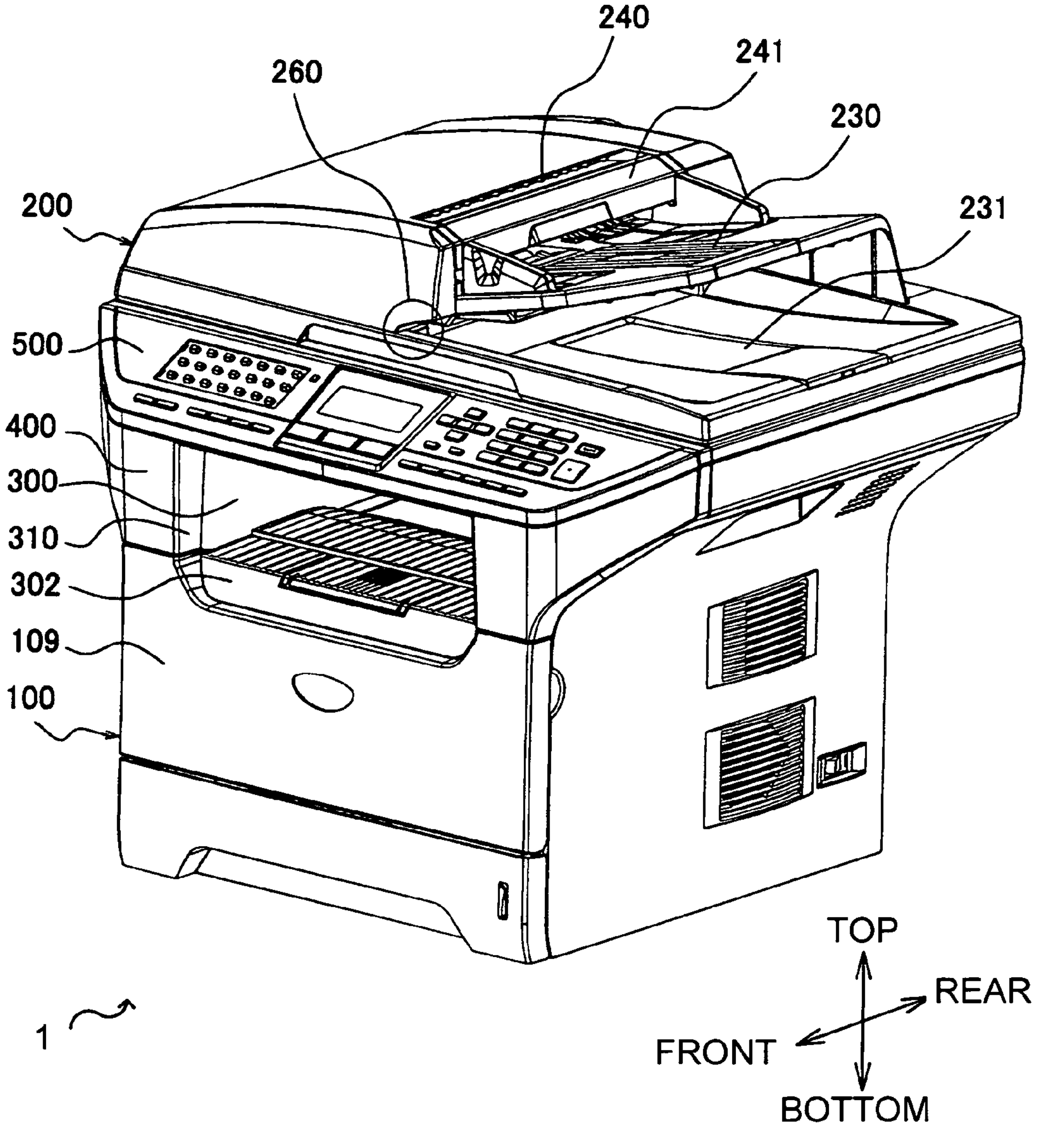
FIG. 1 is a perspective view of an image forming apparatus 1 according to an illustrative aspect of the invention.

As shown in FIG. 1, the electrophotographic image forming part 100 is disposed below a placement space 300, and the image reading part 200, configured to read an image on a document, such as text, is disposed above the placement space 300. The placement space 300 provides an output tray on which recording media printed in the image forming part 100 is ejected and placed.

The image forming part 100 and the image reading part 200 are connected with a joint member 400 disposed therebetween. The placement space 300 is defined within the joint member 400.

An operation panel 500 is provided on an opening 310 side of the placement space 300, that is, on the front side of the image forming apparatus 1 and above the placement space 300. The operation panel 500 is used to input settings of the image forming part 100 and the image reading part 200. On the reverse side (rear side) of the image forming apparatus 1 or an opposite side opposite of the image forming apparatus 1 from the operation panel 500, a cable holder 620 (FIG. 3) is provided for holding a connector part (not shown) and a network cable for connecting the image forming apparatus 1 on a computer network.

Image Forming Part 100

Figure 4:
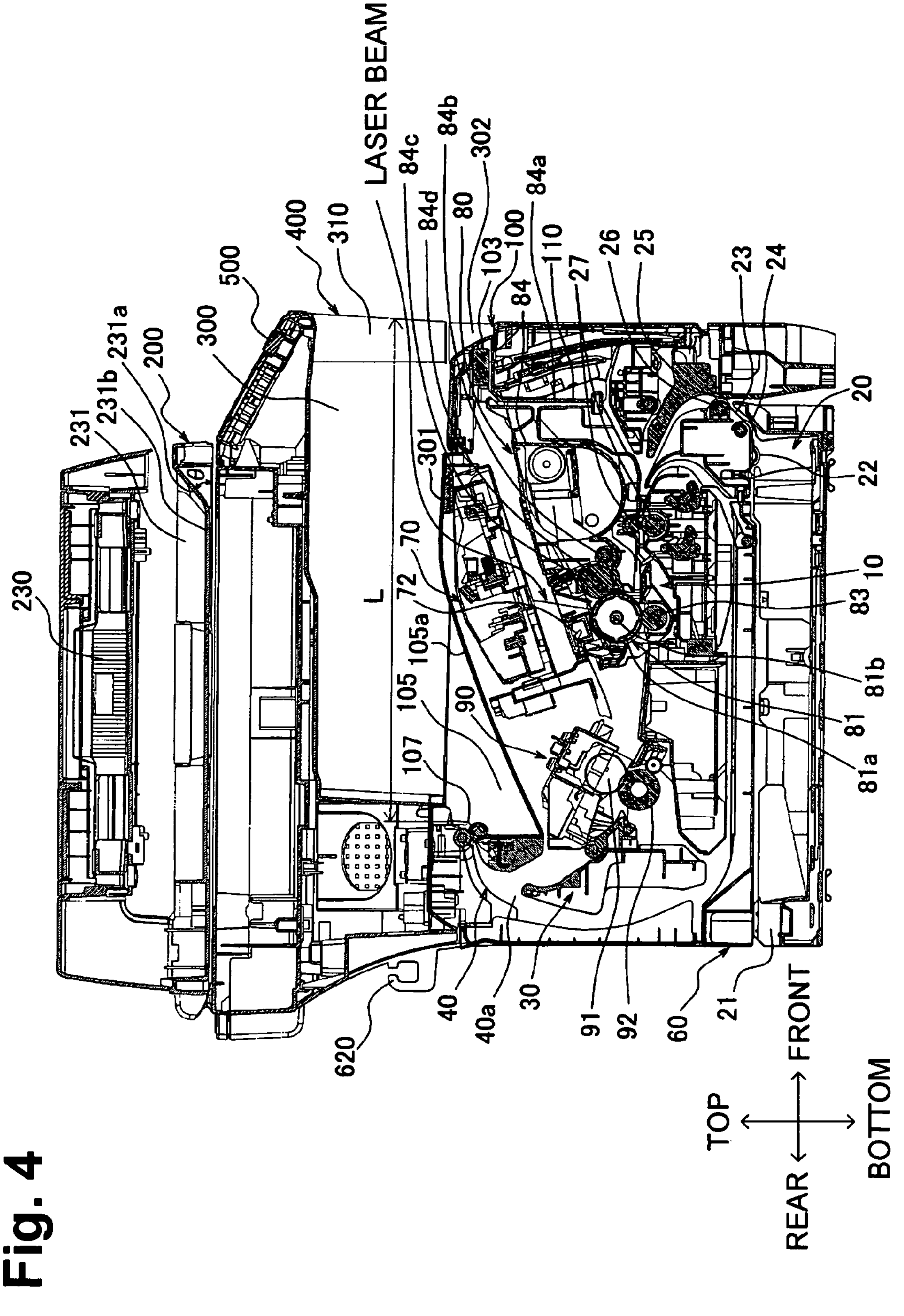
FIG. 4 is a sectional view of the image forming apparatus 1 taken along the line A-A of FIG. 2 according to at least one illustrative aspect of the invention.

The image forming part 100 typically is an electrophotographic printer. As shown in FIG. 4, in the image forming part 100, a recording medium, which is placed in an input tray 21 disposed in a lowermost portion, is fed to a process cartridge

80 including a photosensitive drum 81 disposed above the input tray 21, a toner image on the photosensitive drum 81 is transferred on the recording medium, the transferred image is fixed onto the recording medium in a fixing unit 90, and thus the image is formed on the recording medium.

The image forming part 100 according to this illustrative embodiment has a function to form (print) image on both front and back sides of a recording medium. Specifically, the both side printing function is comprised of a forward/backward switching mechanism 50 and a two-sided printing unit 60. The forward/backward switching mechanism 50 is configured to reverse a sheet feeding direction of a recording medium ejected from the fixing unit 90. After the feeding direction is reversed, the two-sided printing unit 60 provides a feed path to feed the recording medium to the process cartridge 80 again.

At this time, the recording medium placed in the input tray 21 is fed upward meandering so that the feeding direction of the recording medium is changed about 180 degrees at a front or rear end portion of the image forming apparatus 1, and is ejected to the placement space 300.

Details of the Image Forming Part 100

Figure 5:
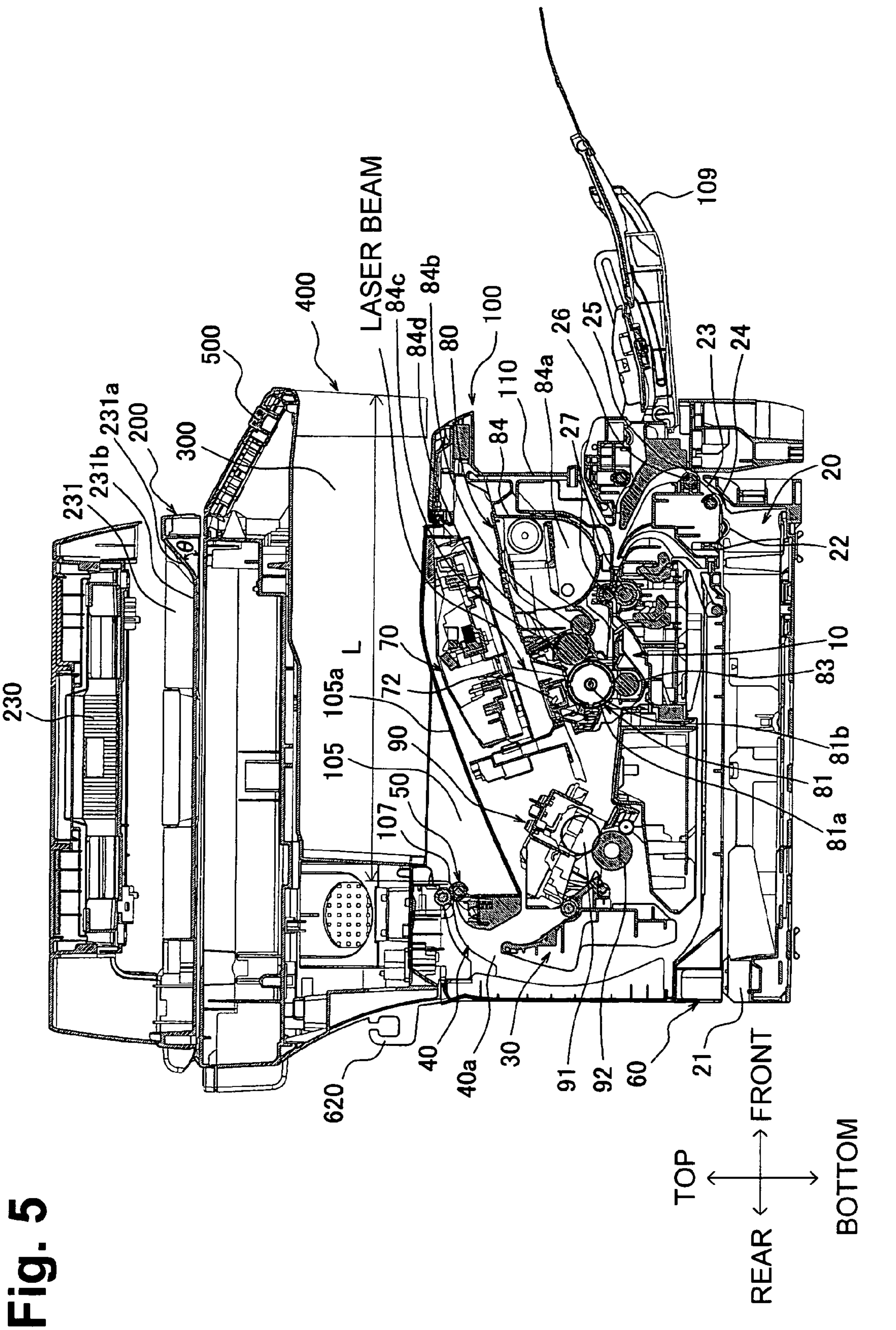
FIG. 5 is a sectional view of the image forming apparatus when a manual feed door, which is provided at the front, is opened according to at least one illustrative aspect of the invention.

As shown in FIGS. 4 and 5, an output tray 105 is provided on a top surface of a housing 103 of the image forming part 100 or on the placement space 300 side. In the output tray 105, a printed recording medium is ejected from the housing 103. The output tray 105 is composed of an inclined surface 105*a*, which slopes down from the top surface of the housing 103 toward the rear side. At the rear end of the inclined surface 105*a*, an outlet 107 is provided. A printed recording medium is ejected from the outlet 107.

A feeder part 20 is a part of a feeding device that supplies a recording medium to the image transfer part 10. A first ejection chute 30 and a second ejection chute 40 are configured to change the feeding direction of a recording medium about 180 degrees to make a U-turn and guide the recording medium to the outlet 107 provided above the fixing unit 90.

The forward/backward switching mechanism 50 is configured to invert the feeding direction of a recording medium ejected from the image transfer part 10 and feed the inverted recording medium to the image transfer part 10 again. The two-sided printing unit 60 provides a feed path for a recording medium of which feeding direction is changed by the forward/backward switching mechanism 50. These devices 10, 20, 30, 40, 50, and 60 are assembled to a frame member and stored in the housing 103.

Figure 2:
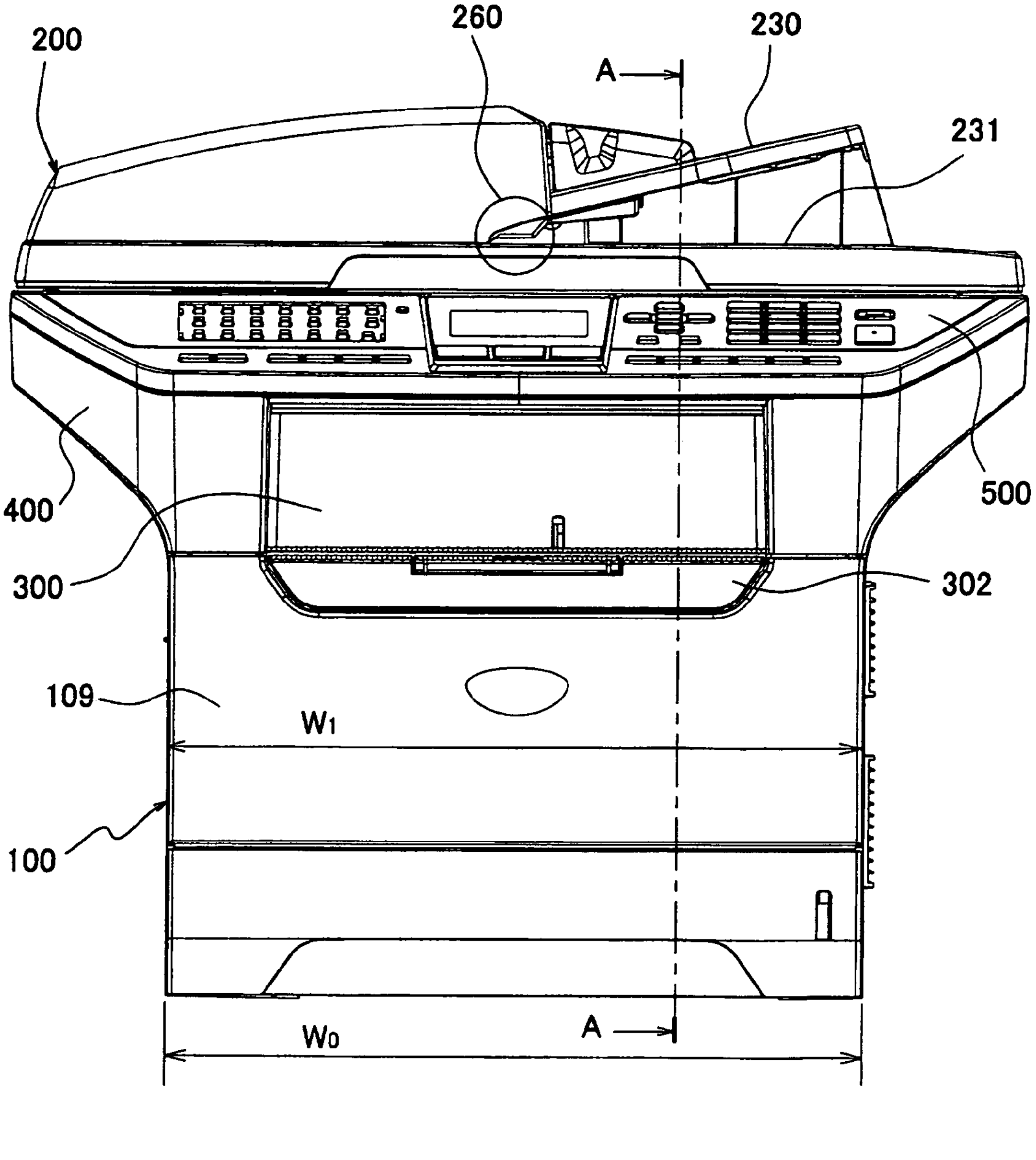
FIG. 2 is a front view of the image forming apparatus 1 according to at least one illustrative aspect of the invention.
Figure 3:
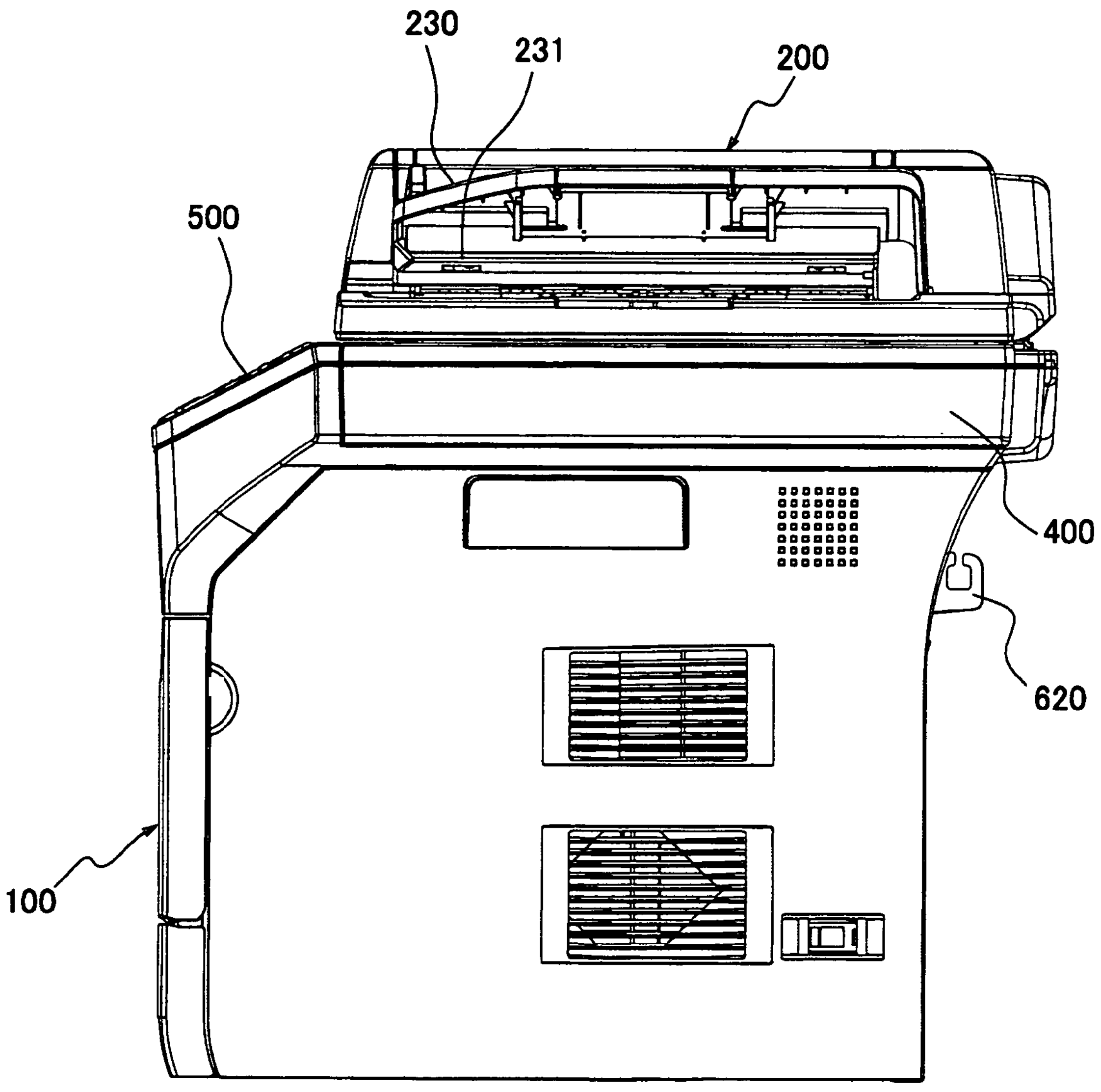
FIG. 3 is a right side view of the image forming apparatus 1 according to at least one illustrative aspect of the invention.

As shown in FIG. 2, a width W0 of the input tray 21 is generally equal to a width W1 of the housing 103 of the image forming part 100. Outer edges defining the opening 310 and an outer wall of the image forming part 100 are flush with each other as shown in FIG. 3 when viewed in a direction perpendicular to a direction where the opening 310 is open, that is, when viewed from a side of the image forming apparatus 1. In a lower outer edge of the opening 310, a recessed portion 302, which is recessed downward from the bottom surface portion 301 defining the placement space 300, is provided.

Feeder Part

As shown in FIGS. 4 and 5, the feeder part 20 includes the input tray 21, a sheet supply roller 22, a separation roller 23, and a separation pad 24. The input tray 21 is stored in the lowermost portion of the housing 103. The sheet supply roller 22 is disposed in an upper portion of and at a front end of the input tray 21 and configured to feed a recording medium to the image transfer part 10. The separation roller 23 and the separation pad 24 are configured to singly separate a recording medium fed by the sheet supply roller 22. A recording medium placed in the input tray 21 is turned in a U-turn at a front side in the housing 103 and fed to the image transfer part 10 disposed generally in a central portion of the housing 103.

A paper dust removing roller 25 is disposed at an outer side of a vertex in a U-shaped feed path where a recording medium is to be fed from the input tray 21 toward the image transfer part 10. The paper dust removing roller 25 is configured to remove foreign matter, such as dust, adhered on a surface to be printed of a recording medium. A roller 26 is disposed at an inner side of the vertex so as to press the recording medium in contact with the paper dust removing roller 25.

A pair of registration rollers 27 is disposed at an entrance to the image transfer part 10 in the feed path from the input tray 21 toward the image transfer part 10. The registration rollers 27 are configured to apply resistance to a recording medium being fed to adjust its skewing.

Image Transfer Part

As shown in FIGS. 4 and 5, the image transfer part 10 includes the scanner part 70, the process cartridge 80, and the fixing unit 90. In this illustrative embodiment, a door 110 for attaching and removing the process cartridge 80 is disposed at a back side when the manual feed door 109 is opened.

Scanner Part

The scanner part 70 is disposed in an upper portion of the housing 103 and configured to form an electrostatic latent image on a surface of the photosensitive drum 81. The scanner part 70 includes a laser light source, a polygon mirror, an fθ lens, reflecting mirrors, and other optical members.

A laser beam emitted from the laser light source is modulated based on predetermined image data, is polarized and scanned at the polygon mirror, passes through the fθ lens, is reflected at the reflecting mirror, is bent further downward by the reflecting mirror, and is directed to a surface of the photosensitive drum 81. Thus, an electrostatic latent image is formed on the surface of the photosensitive drum 81.

Process Cartridge

As shown in FIGS. 4 and 5, the process cartridge 80 is disposed below the scanner part 70 so as to be attached and removed from the housing 103. The process cartridge 80 is comprised of the photosensitive drum 81, a charger 72, a transfer roller 83, and a developer cartridge 84.

The photosensitive drum 81 functions as an image holding device configured to hold an image to be transferred to a recording medium. The photosensitive drum 81 has a cylindrical shape, and includes a drum body 81*a* whose outermost layer is a positively charged photosensitive layer made of polycarbonate, and a drum shaft 81*b* disposed in an axial direction of the drum body 81*a* along a length thereof to rotatably support the drum body 81*a*.

The charger 72 functions as a charging device configured to charge the surface of the photosensitive drum 81, and is disposed behind and diagonally above the photosensitive drum 81 so as to face the photosensitive drum 81 at a distance away. The charger 72 of the embodiment is a scorotron charger configured to charge the surface of the photosensitive drum 81 using a corona discharge uniformly and positively.

The transfer roller 83 functions as a transfer device, and is configured to rotate in connection with the rotation of the photosensitive drum 81 disposed facing the transfer roller 83. When a recording medium passes the photosensitive drum 81, the transfer roller 83 applies a charge having a polarity opposite to that of a charge applied to the photosensitive drum 81 (a negative charge in this illustrative embodiment) to the reversed side of the recording medium, which is opposite to a printed surface, and causes toner adhered onto the surface of the photosensitive drum 81 to transfer to the printed surface of the recording medium.

The developer cartridge 84 includes a toner chamber 84*a* containing toner, a toner supply roller 84*b* configured to supply toner to the photosensitive drum 81, and a developing roller 84*c*.

Toner contained in the toner chamber 84*a* is supplied to the developing roller 84*c* with a rotation of the toner supply roller 84*b*. The toner supplied to the developing roller 84*c* is carried on a surface of the developing roller 84*c*, is uniformly regulated to a specified thickness by a layer thickness regulating blade 84*d*, and then is supplied to the surface of the photosensitive drum 81 exposed to light by the scanner part 70.

Fixing Unit

The fixing unit 90 is disposed at a downstream side from the photosensitive drum 81 in the sheet feeding direction, and is configured to fix toner transferred onto a recording medium by heat. Specifically, the fixing unit 90 includes a heat roller 91 and a pressure roller 92, which are disposed to face each other to sandwich a recording medium therebetween. The heat roller 91 is configured to heat toner and apply a force to feed the recording medium thereto. The pressure roller 92 is configured to press the recording medium toward the heat roller 91.

In the image transfer part 10, an image is formed on a recording medium as follows:

The surface of the photosensitive drum 81 is uniformly and positively charged by the charger 72 along the rotation thereof, and then is exposed by a laser beam emitted from the scanner part 70 by high speed scanning. Thus, an electrical latent image corresponding to an image to be formed on a recording medium is formed on the surface of the photosensitive drum 81.

Along with the rotation of the developing roller 84*c*, positively charged toner that is carried on the developing roller 84*c* makes contact with the photosensitive drum 81, and is supplied to the electrostatic latent image formed on the surface of the photosensitive drum 81. That is, the toner is supplied to an exposed part of the surface of the photosensitive drum 81 uniformly and positively charged, where the potential becomes low due to exposure to the laser beam. Thus, the latent image on the surface of the photosensitive drum 81 becomes visible, and a toner image due to reversal is carried on the photosensitive drum 81.

The toner image carried on the surface of the photosensitive drum 81 is transferred to the recording medium by a bias applied to the transfer roller 83. The recording medium on which the toner image has been transferred is fed to the fixing unit 90, heated therein, the toner transferred as the toner image is fixed on the recording medium, and image formation is completed.

First Ejection Chute and Second Ejection Chute

The first ejection chute 30 is disposed at a downstream side of the fixing unit 90 with respect to the feeding direction, and is a guide device configured to convert the feeding direction of a recording medium whose image formation is completed in the image transfer part 10 about 90 degrees and guide the recording medium to the second ejection chute 40.

The second ejection chute 40 is disposed away from the first ejection chute 40 at a specified clearance 40*a*. The second ejection chute 40 is a guide device configured to convert the feeding direction of the recording medium furthermore about 90 degrees and guide the recording medium to the outlet 107.

The clearance 40*a* between the first ejection chute 30 and the second ejection chute 40 defines a part of a feed path for a recording medium whose feeding direction is reversed by the forward/backward switching mechanism 50.

As is apparent from FIGS. 4 and 5, a recording medium meanders up through the image forming part 100 while being reversed at an end portion with respect to the front-rear direction of the image forming apparatus 1 so that its feeding direction is changed about 180 degrees in the up and down direction. That is, in the image forming part 100, a recording medium is fed in the front-rear direction of the image forming apparatus 1 when viewed from the top.

Image Reading Part 200

The image reading part 200 is provided with a document mounting table 202 that functions as a flatbed scanner (FBS), and a document cover 203 including an auto document feeder 201 (ADF). The document cover 203 is attached to the document mounting table 202, and it may be opened and closed at the rear side.

Platen glasses 220, 221 are disposed on the top of the document mounting table 202 where the document cover 203 faces. When the document cover 203 is opened, the platens 220, 221 are exposed. When the document cover 203 is closed, the top surface of the document mounting table 202 including the platens 220, 221 is completely covered.

The document cover 203 is provided with a document pressing member 203*a* that is configured to press a document toward an image reading unit 222, which will be described later. The document pressing member 203*a* is covered with the document cover 203. A surface of the document pressing member 203*a* facing the platen 220 has a color (white in this illustrative embodiment) having light reflectance higher than a specified value.

When the image reading part 200 is used as an FBS, a document is placed on the platen 220. The platen 220 is formed of a transparent light-transmitting member, made of such as glass and acrylate. An area where light can be projected through the platen 220 forms a document reading area (a stationary reading part) in the FBS.

The platen 221 is a reading position when the ADF 201 of the image reading part 200 is used. As with the platen 220, the platen 221 is formed of a transparent light-transmitting member, such as glass and acrylate. An area where light can be projected through the platen 221, which extends in a direction perpendicular to the main scanning direction of the image reading unit 222, forms a document reading area (for auto feed reading part).

A positioning member 223 is interposed between the platens 220 and 221. The positioning member 223 is used as a reference point for a document to be placed on the platen 220. The positioning member 223 is also formed with a guide surface that catches and deflects the leading edge of a document being fed along the platen 221 to thereby return the document to the ADF 201.

The image reading unit 222 is built into or otherwise associated with the document mounting table 202 so as to face the platen glasses 220, 221. The image reading unit 222 is an image sensor that emits light onto a document from a light source via the platens 220 and 221, focuses the light reflected from the document into a photoreceptor and converts the reflected light into electric signals.

Specifically, the image reading unit 222 is made up of an image pickup element, such as a contact image sensor (CIS), and a charge coupled device (CCD) image sensor of a reduction optical system.

A driving force from a carriage motor (not shown) is transmitted to the image reading unit 222, and the image reading unit 222 then is reciprocally moved in parallel with the platens 20, 21 to scan a document.

The document cover 203 is provided with the ADF 201 that successively feeds documents from an input tray 230 to an output tray 231 (document ejection part) via a feed path 232. During the feeding process by the ADF 201, while a document passes over the platen 221, an image on the document is read by the image reading unit 222 provided under the platen 221.

The document cover 203 includes the input tray 230 where a document being read by the ADF 201 is placed, and the output tray 231 where a document that has undergone a reading process is ejected. The output tray 231 is disposed under the input tray 230 vertically away therefrom.

A cutout portion 260 (FIG. 1) is provided in a portion of a side surface of the document cover 203 that connects with the output tray 231. The cutout portion 260 is formed on the ejection roller 236 side.

As shown in FIGS. 4 and 5, in a side wall portion 231*a* of the output tray 231, a portion corresponding to at least the cutout portion 260 has an inclined surface smoothly continuing from a bottom surface portion 231*b*. In the illustrative embodiment, an inclination angle θ of the side wall portion 231*a* is set to about 45 degrees, however, any suitable angle may be used.

Figure 6:
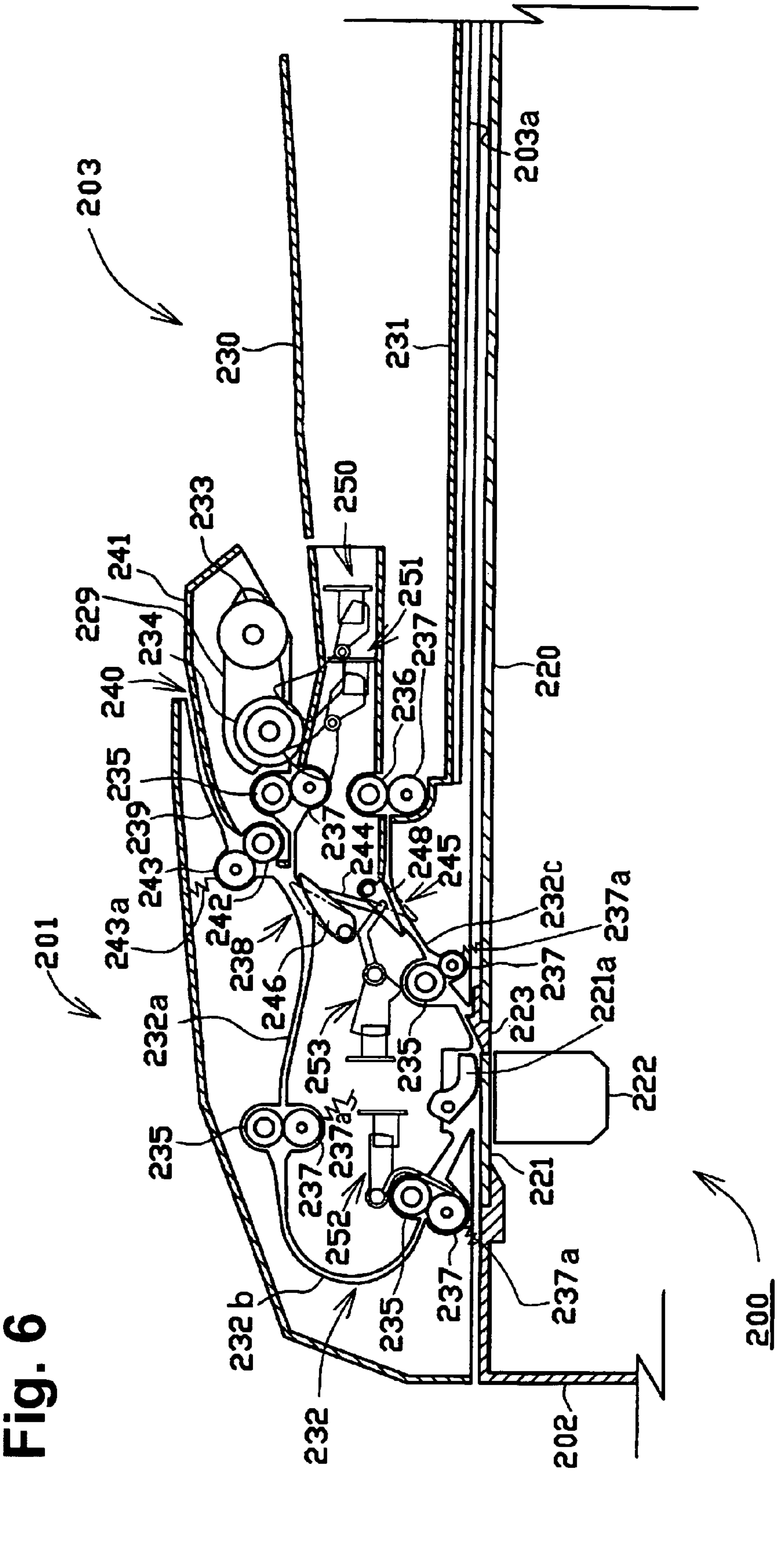
FIG. 6 is a sectional view of an image reading part 200 according to at least one illustrative aspect of the invention.

As shown in FIG. 6, the feed path 232, which has generally a "U" shape, is formed inside the ADF 3 so as to connect the input tray 230 and the output tray 231. The feed path 232 is continuously formed of various structural members forming an ADF main body and guide plates, and the feed path 232 has a width where a document can pass.

The feed path 232 is mainly made up of three portions: an upper portion 232A, a curved portion 232B, and a lower portion 232C. The upper portion 232A and the lower portion 232C are upper and lower straight portions in the "U" shape, and the curved portion 232B is curved to continuously connect the upper portion 232A and the lower portion 232C. The feed path 232 is used as a path for a document to be fed in both cases when an image on a single surface only of a document is read and when images on both sides of a document are read using the ADF 201.

In the feed path 232, a pickup roller 233, a separation roller 234, feeding rollers 235 and an ejection roller 236 are disposed in this order from an upstream side with respect to the feeding direction. Pinch rollers 237 are disposed to be pressed into contact with the feeding rollers 235 and the ejection roller 236. These rollers 232, 234, 235, 236, and 237 form a feeding device for feeding a document placed on the input tray 230 to the output tray 231. A separation pad is disposed at an opposite position of the separation roller 234 to press into contact with a roller surface of the separation roller 234 and separate documents singly by friction.

The pickup roller 233 is rotatably provided at an end portion of an arm 229, which is provided coaxially with a shaft of the separation roller 234. The separation roller 234 is rotatably provided away from the pickup roller 33 in the feeding direction so as to contact an opposing surface of the feed path 232.

A driving force is transmitted from a motor to the pickup roller 233 and the separation roller 234, which are rotatably driven. The driving force from the motor is further transmitted to the arm 229, which is vertically moved. The pickup roller 233 and the separation roller 234 are identical in diameter size, and they are driven at the same peripheral velocity.

The feeding rollers 235 are disposed in specified positions on the feed path 232. In the illustrative embodiment, the feed rollers 235 are disposed in the following four positions: in a directly downstream side from the separation roller 234; in the upper portion 232A of the feed path 232; in the lower portion 232C of the feed path 232 and directly upstream from the reading position; and in the lower portion 232C of the feed path 232 and directly downstream from the reading position. The feeding rollers 235 are rotatably driven by power transmitted from the feed motor.

The shaft of each pinch roller 237 is elastically urged by a spring 237*a* so that each pinch roller 237 is pressed in contact with the roller surface of its respective feeding roller 235. When each feeding roller 235 is rotated, its respective pinch roller 37 is also rotated.

A document holding member 221*a* is disposed above the platen 221. The document holding member 221*a* is configured to press a document being fed toward the image reading unit 222. The feeding rollers 235 and the pinch rollers 237, which are disposed at both sides of the document holding member 221*a* with respect to the feeding direction, are set to apply a specified tension to the document on the platen 221.

A bidirectional feed path 239 (also called a "switchback" path) is connected to the upper portion 232A of the feed path 232. The bidirectional feed path 239 is used for double-side reading, and it is designed to resend a document whose front side has been scanned to the feed path 232. The bidirectional feed path 239 diverges from a first branch position 238 of the upper portion 232A, which is disposed on an upstream side of the reading position, and extends diagonally upward toward the input tray 230.

A termination of the bidirectional feed path 239 is open toward the top surface of the ADF 201 above the input tray 230, and provides a bidirectional feed ejection opening 240. The bidirectional feed ejection opening 240 allows at least a part of a document of which front side has been read and the feeding direction is reversed to protrude outside the ADF 201 (auto feed reading part).

A length of a feed path provided by the bidirectional feed path 239 is set longer than a length of a largest sized document that can be at least read.

A reversible roller 242 is disposed in the bidirectional feed path 239. As a driving force is transmitted from the feed motor to the reversible roller 242, the reversible roller 242 is rotated in both the forward and reverse directions.

Facing the reversible roller 242, a pinch roller 243 is disposed to press a document toward the reversible roller 242. A shaft of the pinch roller 243 is elastically urged by a spring 243*a* that generates a smaller pressing force than that of the spring 237*a* urging the pinch roller 237. Thus, as the reversible roller 242 rotates, the pinch roller 237 is also rotated following the rotation of the reversible roller 242.

A document supporting part 241 is formed continuously from the bidirectional feed ejection opening 240 to the input tray 230. A document protruding from the bidirectional feed ejection opening 240 is supported by the document supporting part 241.

A bypass 244 is formed on a downstream side of the reading position in the lower portion 232C of the feed path 232. The bypass 244 is configured to guide a document whose front side has been read at the reading position, to the bidirectional feed path 239 in double-side reading. The bypass 244 diverges from a second branch position 245, which is on the downstream side of the reading position in the lower portion 232C of the feed path 232, and extends diagonally upward to connect with the first branch position 238.

Figure 7:
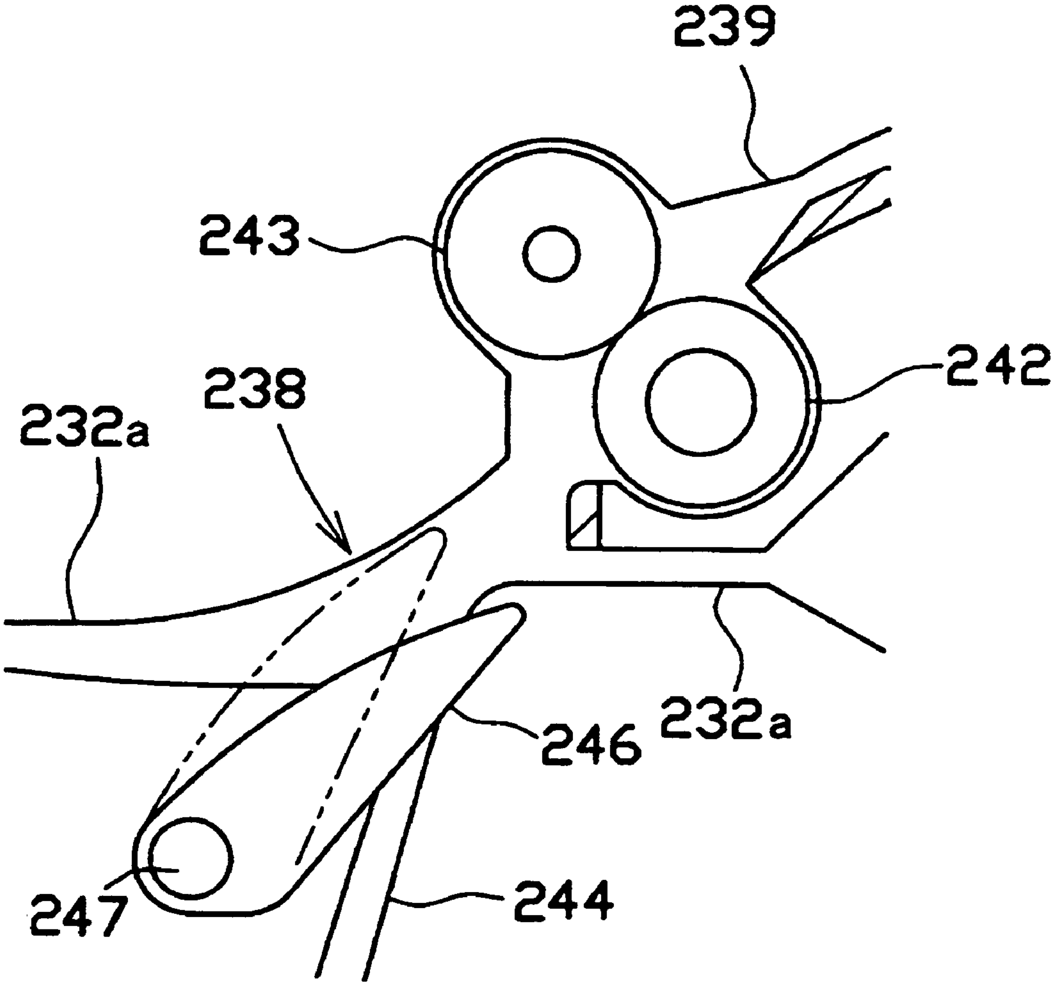
FIG. 7 is an enlarged view of a part of ADF according to at least one illustrative aspect of the invention.

As shown in FIGS. 6 and 7, a guide flap 246 for guiding the document to an appropriate feed path is disposed at the first branch position 238. The guide flap 246 is pivotable on a shaft 247 to change its position between a position shown by a solid line in FIG. 7 and a position shown by a double dotted line in FIG. 7.

When the guide flap 246 is placed in the position shown by the solid line, the feed path continues from the input tray 230

(right side in the figure) in the upper portion 232*a* of the feed path 232 to the reading position (left side in the figure). With this structure, a document that has been fed from the input tray 230 is guided at the first branch position 238 toward an upstream side of the reading position in the upper portion 232*a* of the feed path 232.

When the guide flap 246 is placed in the position shown by the double dotted line, a feed path continues from the bypass 244 to the bidirectional feed path 239. Thus, a document being fed upward in the bypass 244 is guided at the first branch position 238 to go to the bidirectional feed path 239.

Switching the feed path by the guide flap 246 takes place when the document contacts the guide flap 246. The guide flap 246 is biased to be located at the position shown by the solid line, where the feed path continues from the input tray 230 (right side in the figure) in the upper portion 232*a* of the feed path 232 to the reading position (left side in the figure), under its own weight or as a result of undergoing an urging force of an elastic member such as a spring.

When a document being fed upward in the bypass 244 comes in contact with the guide flap 246, the guide flap 246 is pushed upward and placed in the position shown by the double dotted line in FIG. 7, so that the document goes to the bidirectional feed path 239.

When the document is fed from the bidirectional feed path 239 to the first branch position 238, it comes in contact with the guide flap 236. However, as the guide flap 246 is regulated so that it does not move downward from the position shown by the solid line in FIG. 7, the document is guided by the guide flap 246 to go to the reading position (left side in the figure) via the upper portion 232*a* of the feed path 232.

Figure 8:
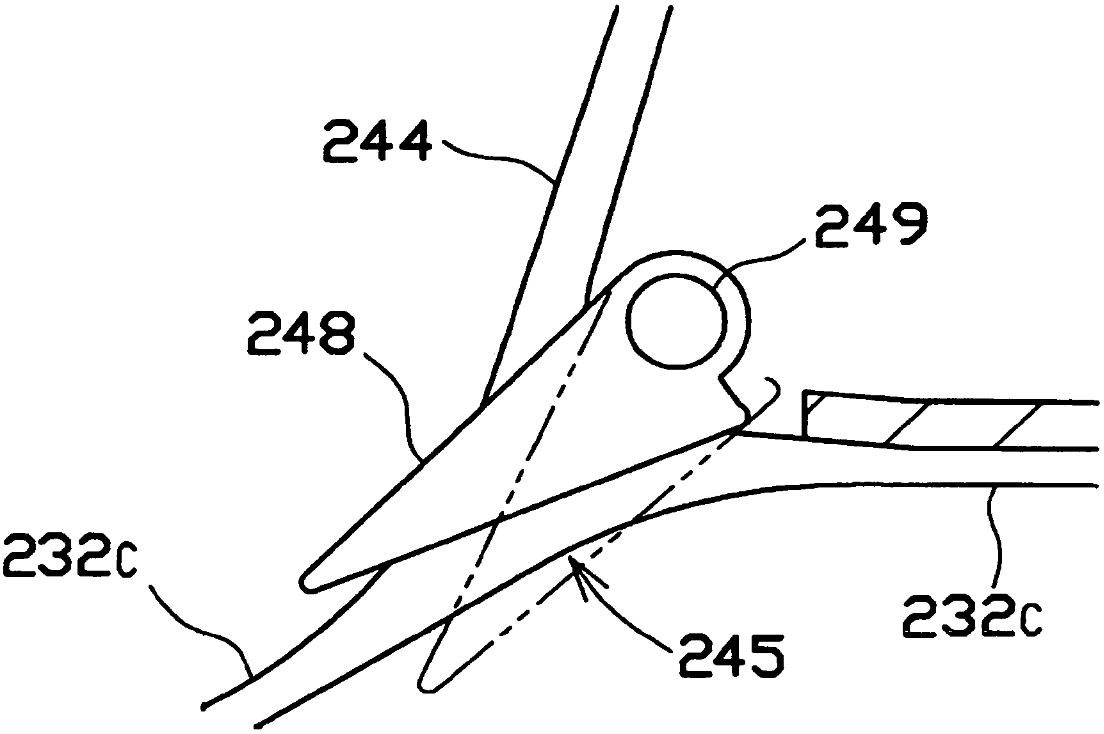
FIG. 8 is an enlarged view of a part of ADF according to at least one illustrative aspect of the invention.

As shown in FIGS. 6 and 8, a guide flap 248 for guiding the document to an appropriate feed path is disposed at the second branch position 245. The guide flap 248 is pivotable on a shaft 249 to change its position between a position shown by a solid line in FIG. 8 and a position shown by a double dotted line in FIG. 8.

When the guide flap 248 is placed in the position shown by the solid line, a feed path from the reading position (left side in FIG. 8) of the feed path 232 to the output tray 231 (right side in FIG. 8). As a result, a document that has passed the reading position is guided at the second branch position 245 from the lower portion 232*c* of the feed path 232 toward the output tray 231.

When the guide flap 248 is placed in the position shown by the double dotted line, a feed path continues from reading position in the lower portion 232*c* of the feed path 232 to the bypass 244. Thus, a document that has passed the reading position is guided at the second position 245 to go to the bypass 244.

As shown in FIG. 6, a plurality of sensors for detecting conveyance of a document may be provided along the feed path 232 and the bypass 244. Specifically, the feed path 232 includes a first front sensor 250 and a second front sensor 251 on upstream and downstream sides of the separation roller 234, respectively, and a rear sensor 252 on a directly upstream side of the reading position. The bypass 244 includes a bidirectional feed sensor 253.

Image Reading Operation of Image Reading Part 200

The image reading part 200 can be used both as a FBS and with the ADF 201, with conventional operation of the system as a FBS.

If the ADF 201 is used, the document cover 203 should be closed against the document mounting table 202. A document to be read is placed on the input tray 230. In the illustrative embodiment, the document should be placed on the input tray 30 with a surface to be read (front side) thereof face up.

When a reading start is inputted in the image reading part 200, a carriage motor drives feed rollers, and the pickup roller 233, the separation roller 234, the feed rollers 235, the ejection roller 236, and the reversible roller 242 are rotated at their respective timings. When the arm 229 is lowered, the pickup roller 233 is pressed in contact with the document on the input tray 230.

Starting from the document, which is placed in an uppermost position and is directly subjected to the rotation of the pickup roller 233 and the separation roller 234, the documents are singly separated from the stack and fed into the feed path 232. The picked up document is guided into the feed path 232 to go to the reading position, and read by the image reading unit 222 remaining at rest under the reading position. The read document is ejected to the output tray 231.

Single-Side Reading

Figure 9:
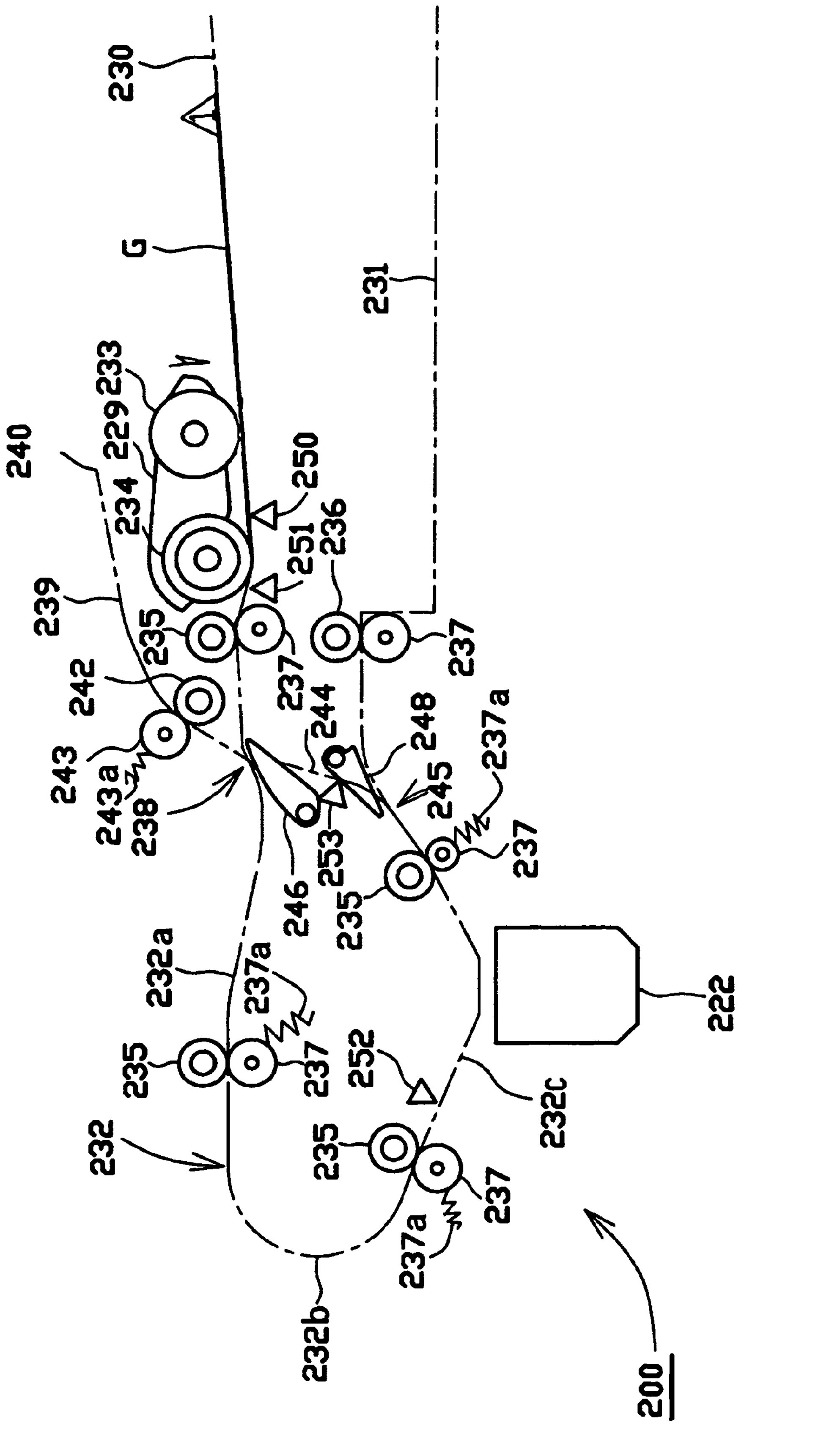
FIGS. 9 through 23 schematically show how a document is fed according to at least one illustrative aspect of the invention.
Figure 10:
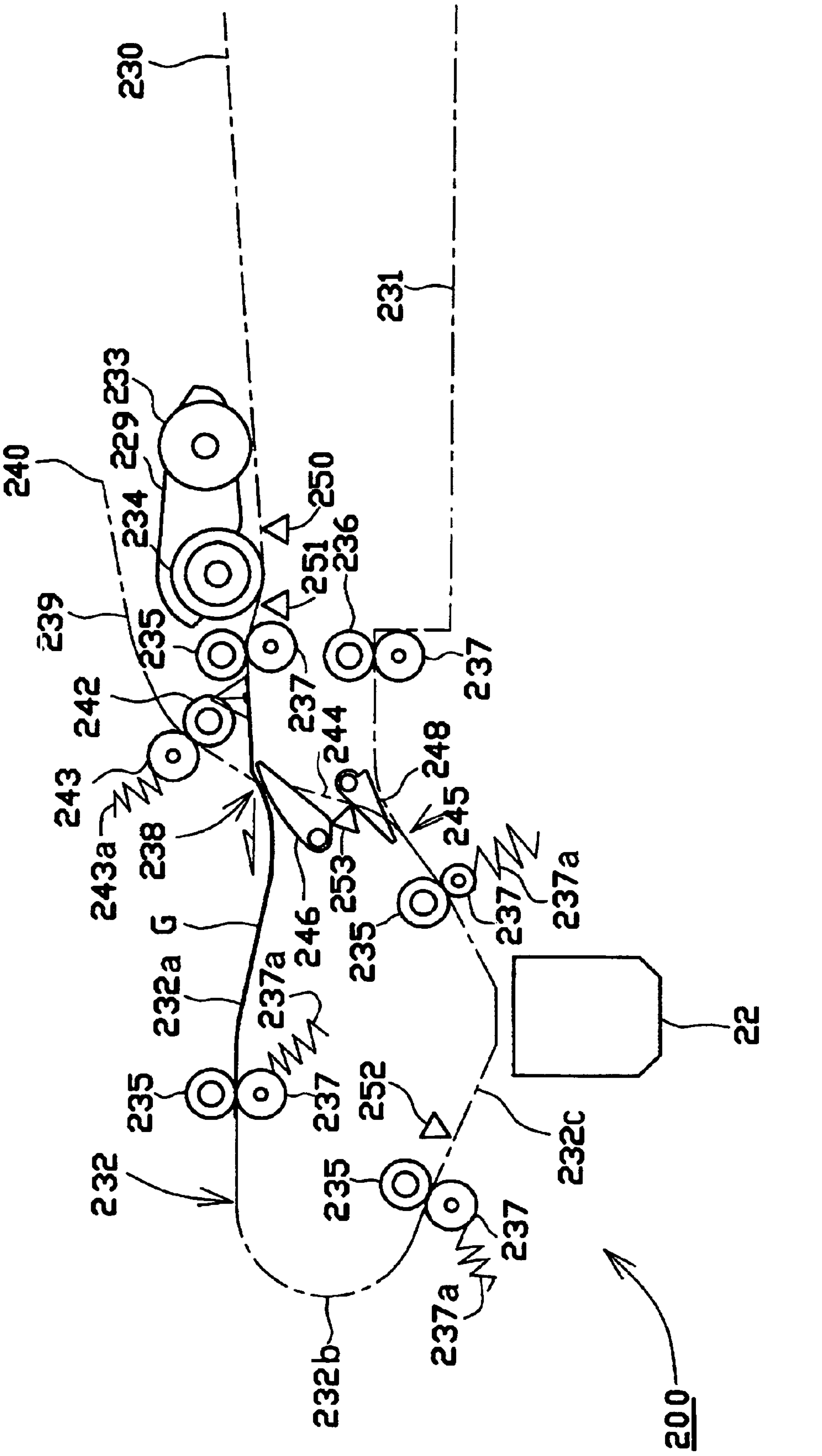

As shown in FIG. 9, when a reading start is inputted in the image reading part 200, the guide flap 248 changes the feed path at the second branch position 245 so as to continue from the reading position of the fee path 232 to the output tray 231. The guide flap 246 is placed in the position so as to continue the feed path at the first branch position 238 from the input tray 230 to the reading position in the feed path 232. When the flap guide 246 is not in contact with the document G, it is placed in the position so as to continue the feed path at the first branch position 238 from the input tray 230 to the reading position of the feed path 232.

The first front sensor 250 detects whether a document G is placed on the input tray 230. When no document is placed on the input tray 230, an error message “no document” appears on a display portion of the image reading part 200.

When a document G is placed on the input tray 230, a driving force is transmitted from the feed motor to the arm 229, and the arm 229 is lowered. Then, the pickup roller 233 is pressed in contact with the document G on the input tray 230. When the pickup roller 233 and the separation roller 234 rotate, the document G is fed into the feed path 232.

In the feed path 232, a driving force from the feed motor is transmitted to the feed rollers 235 and the ejection roller 236, and each roller rotates so as to feed the document G from the upstream side of the feed path 232 to the downstream side.

The document G is picked up from the input tray 230, fed into the feed path 232, nipped between the feed roller 35 and the pinch roller 37 in which the rotational force is transmitted to the document G, and fed at the first branch position 238 to the upstream side of the reading position of the feed path 232.

The feed path 232 from the input tray 230 toward the reading position is generally straight, whereas the feed path from the input tray 230 toward the bidirectional feed path 239 is sharply bent. Thus, the document picked up from the input tray 230 is not fed into the bidirectional feed path 239.

As the feed path at the first branch position 238 toward the bypass 244 is closed by the guide flap 246, the document G is guided by the guide flap 246 at the first branch position 238 toward the upstream side of the reading position.

Figure 11:
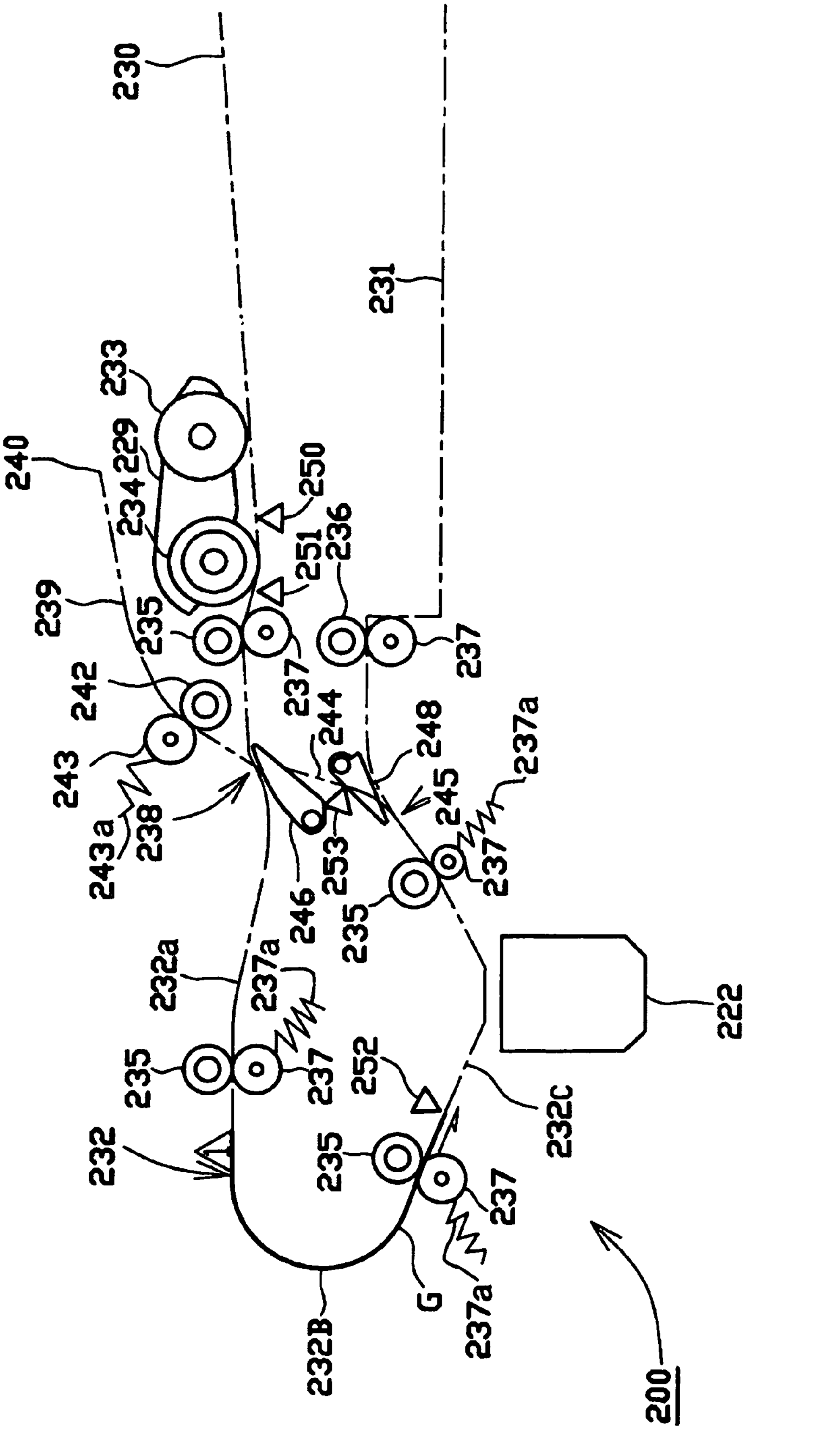
Figure 12:
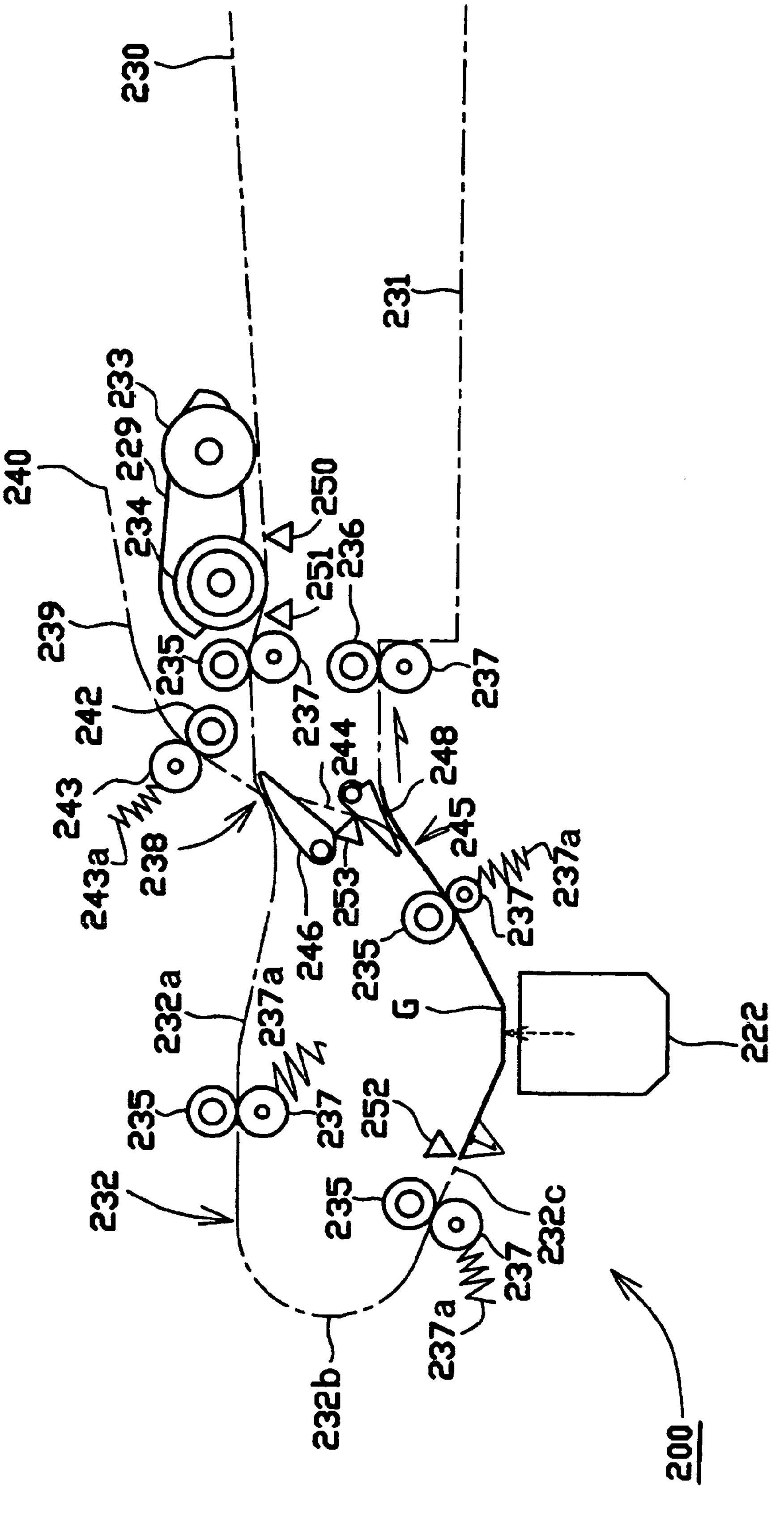

As shown in FIG. 11, the document G is inverted downward at the curved portion 232*b*, and the leading end of the document G is detected by the rear sensor 252. The leading end of the document G reaches the reading position when a fixed time passes after being detected by the rear sensor 252. When the leading end of the document G reaches the reading position, the image reading unit 222 starts image reading of the document G.

The document G passes the reading position with the front side opposing the image reading unit 222, and the image on the front side of the document G is read by the image reading unit 222. The image reading unit 222 finishes image reading of the document G when a fixed time passes after the trailing end of the document G is detected by the rear sensor 252.

Figure 13:
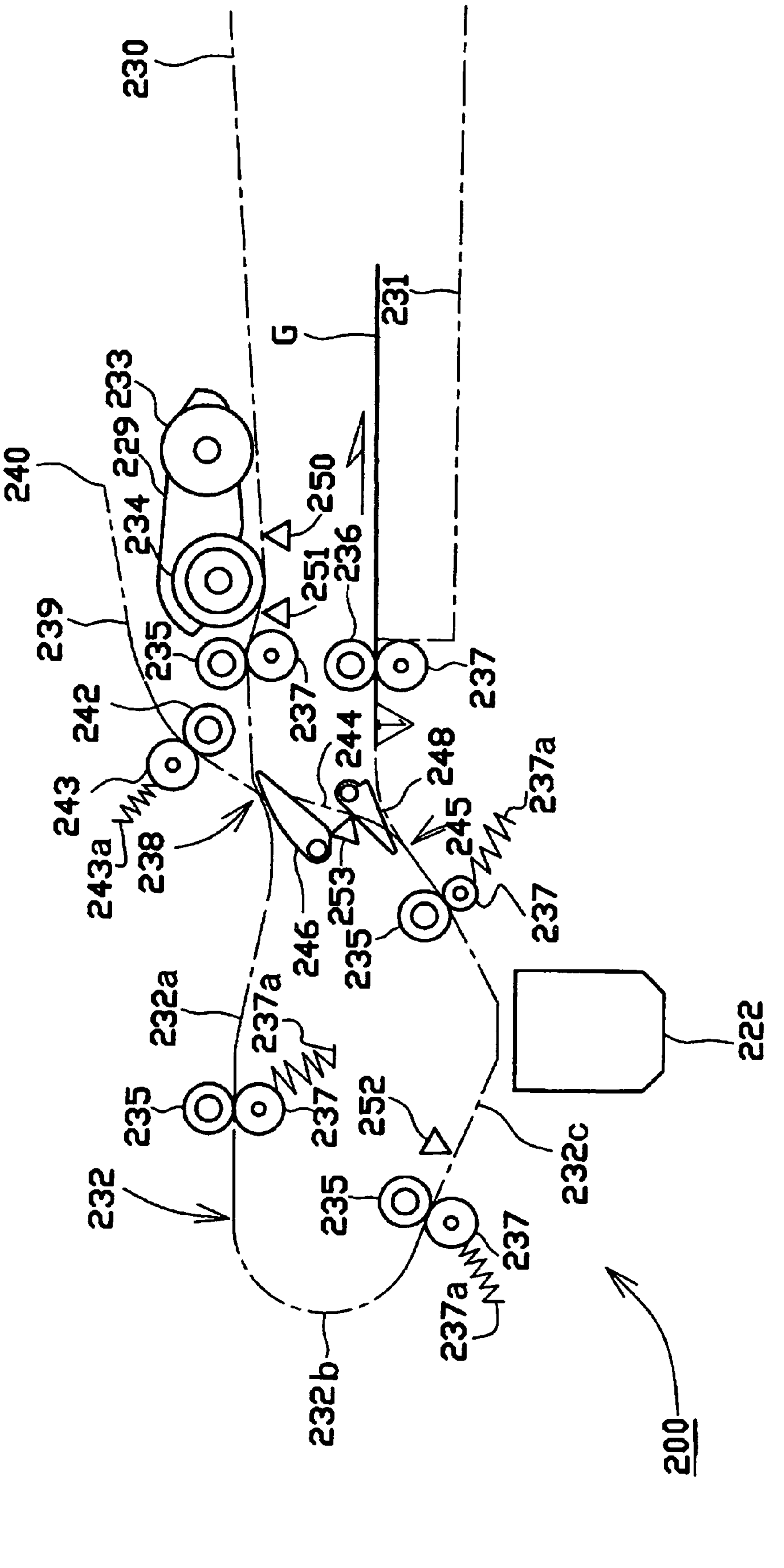

The document G is guided at the second branch position 245 by the guide flap 248 toward the output tray 231 side of the feed path 232. As shown in FIG. 13, the document G is nipped between the ejection roller 236 and the pinch roller 237, and then ejected from the feed path 232 to the output tray 231.

When the following document G is set on the input tray 230, it is singly picked up and fed from the input tray 230, and image reading is performed by repeating the above operations.

Double-Side Reading

Figure 14:
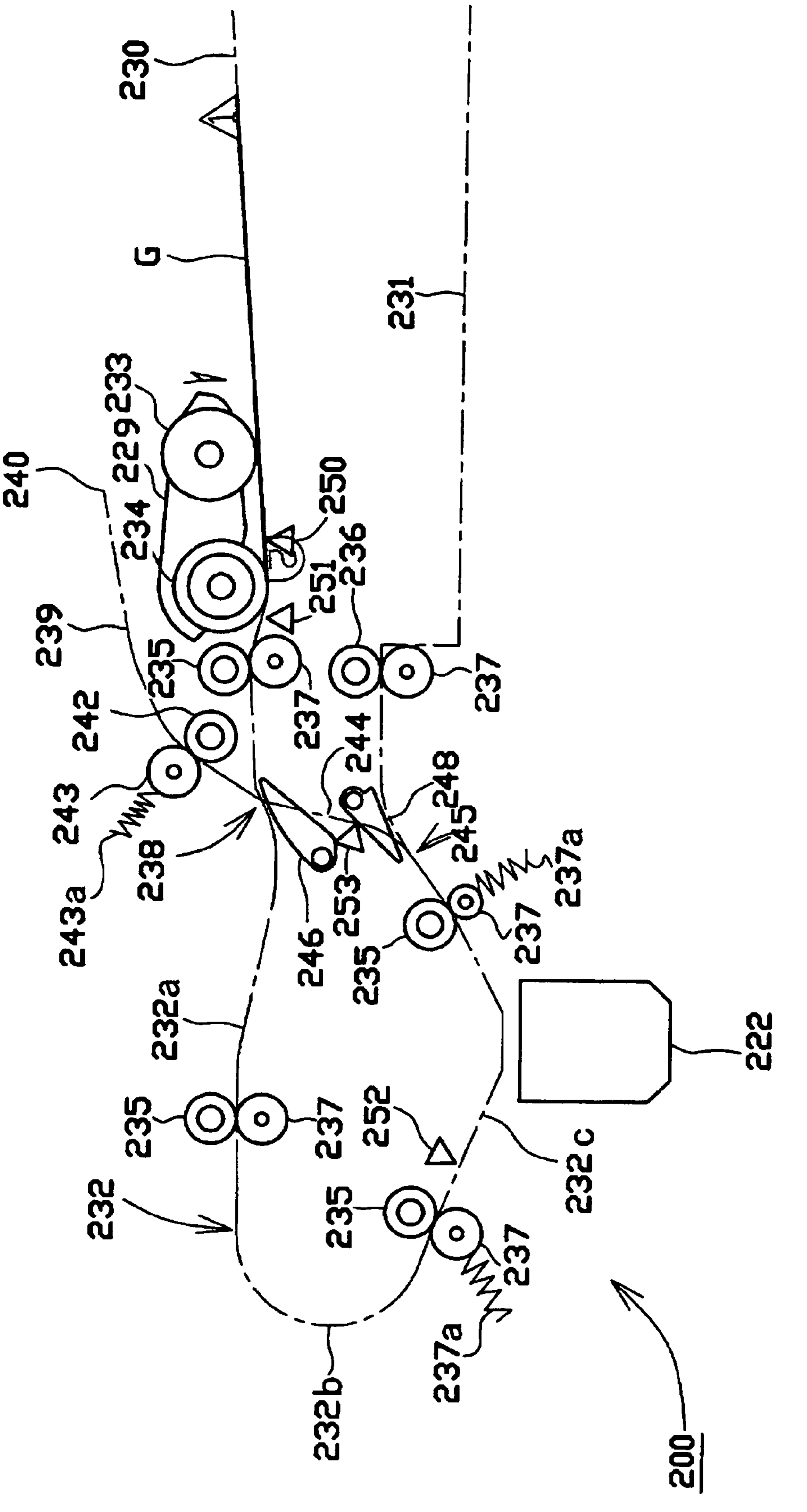

As shown in FIG. 14, the guide flap 246 is placed so that the feed path at the first branch position 238 continues from the input tray 230 of the feed path 232 toward the reading position. In FIG. 14, a surface of a document G indicated with the number "1" refers to the front side of the document G, which is to be read first in the double-side reading, and a surface indicated with the number "2" refers to the back side of the document G, which is to be read next in the double-side reading.

As is the case with the single-side reading, the first front sensor 250 detects whether a document G is placed on the input tray 230, the arm 229 is lowered, the pickup roller 233 and the separation roller 234 are rotated, and the document G is fed into the feed path 232.

In the feed path 232, the feed rollers 35 are rotated so as to feed the document G from the upstream side to the downstream side, the document G is fed from the input tray 230 to the feed path 232, guided at the first branch position 238 by the guide flap 246 toward the reading position of the feed path 232.

Figure 15:
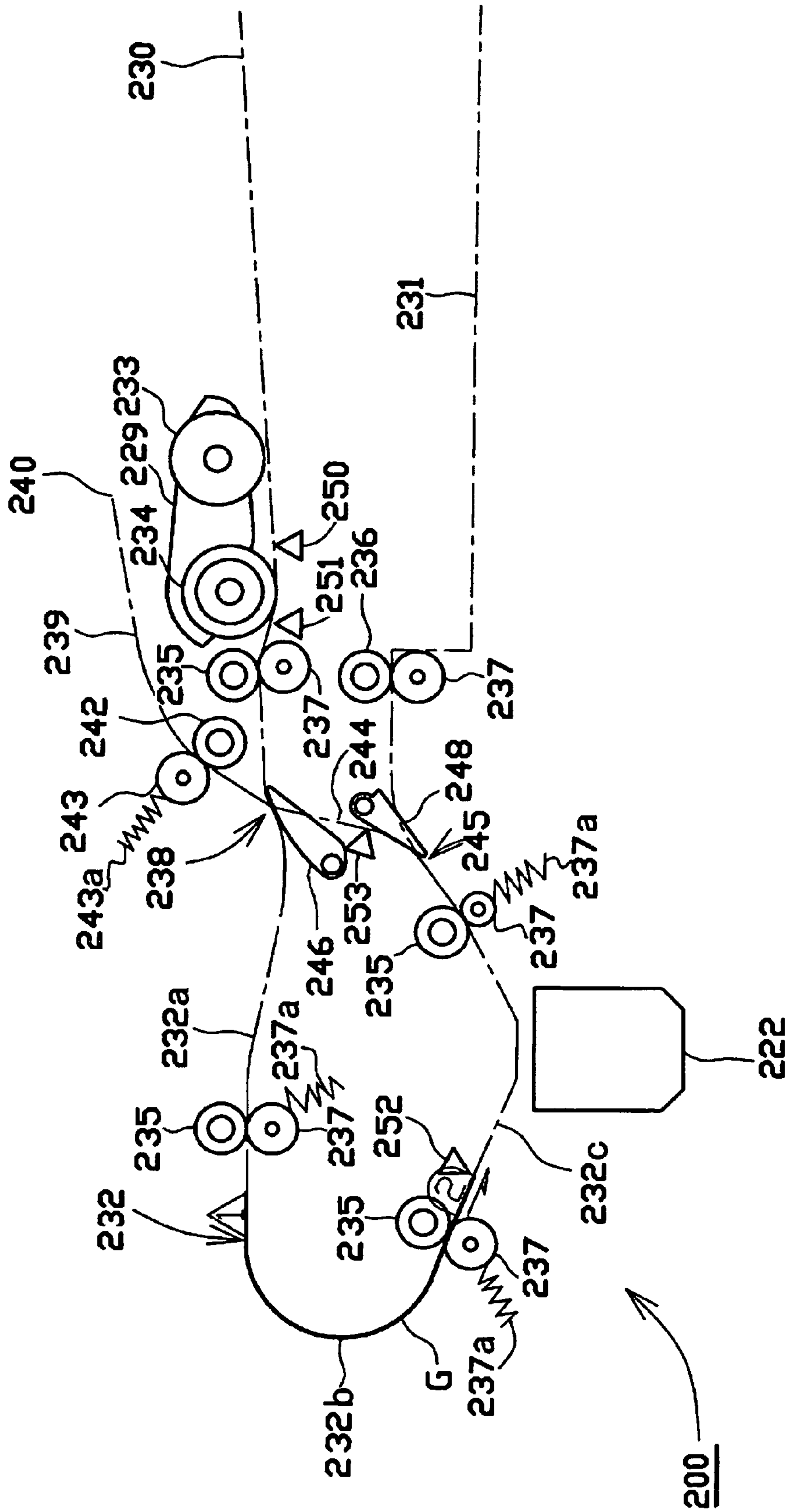

As shown in FIG. 15, when the document G reaches between the first branch position 238 and the second branch position 245 in the feed path 232, the guide flap 248 changes the feed path.

That is, the trailing end of the document G passes over the first branch position 238 when a fixed time passes after the trailing end of the document G is detected by the second front sensor 251. Thus, it is determined that the document G reaches between the first branch position 238 and the second branch position 245 in the feed path 232 by counting a detection signal by the second front sensor 251, and a feeding length or time by the feeding rollers 235.

When it is determined that the document G reaches between the first branch position 238 and the second branch position 245, the guide flap 248 changes the feed path at the second branch position 245 to continue from the reading position toward the bypass 244.

The document G is inverted downward at the curved portion 232*b* of the feed path 232, the leading end of the document G is detected by the rear sensor 252 and reaches the reading position, and then the image on the front side of the document G is read by the image reading unit 222.

Figure 16:
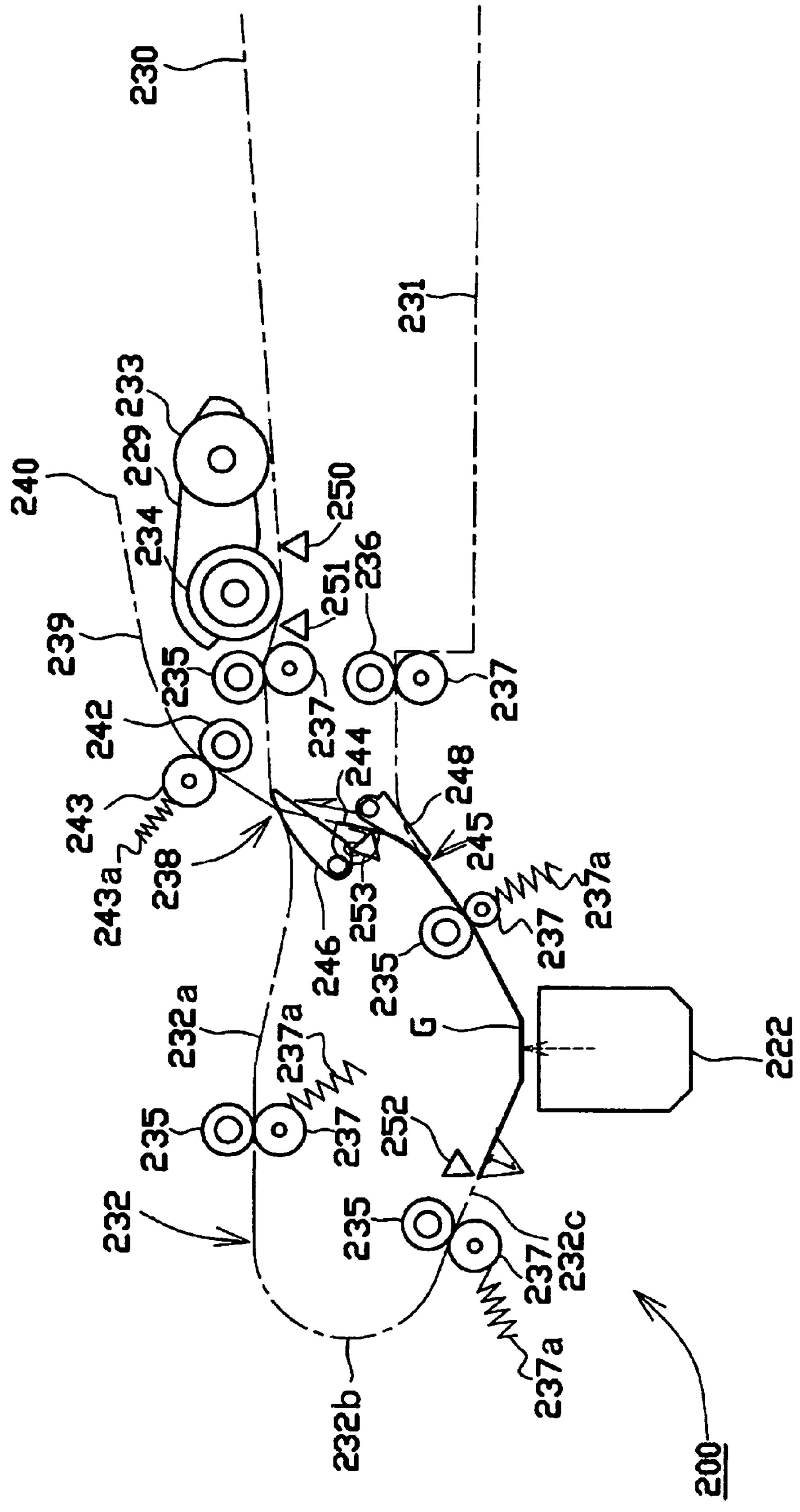

Then, the document G of which the front side has been read is guided at the second branch position 245 by the guide flap 248 to go to the bypass 244 from the feed path 232, as shown in FIG. 16. The image reading unit 222 finishes image reading of the document G when a fixed time passes after the trailing end of the document G is detected by the rear sensor 252 and reaches the reading position.

Figure 17:
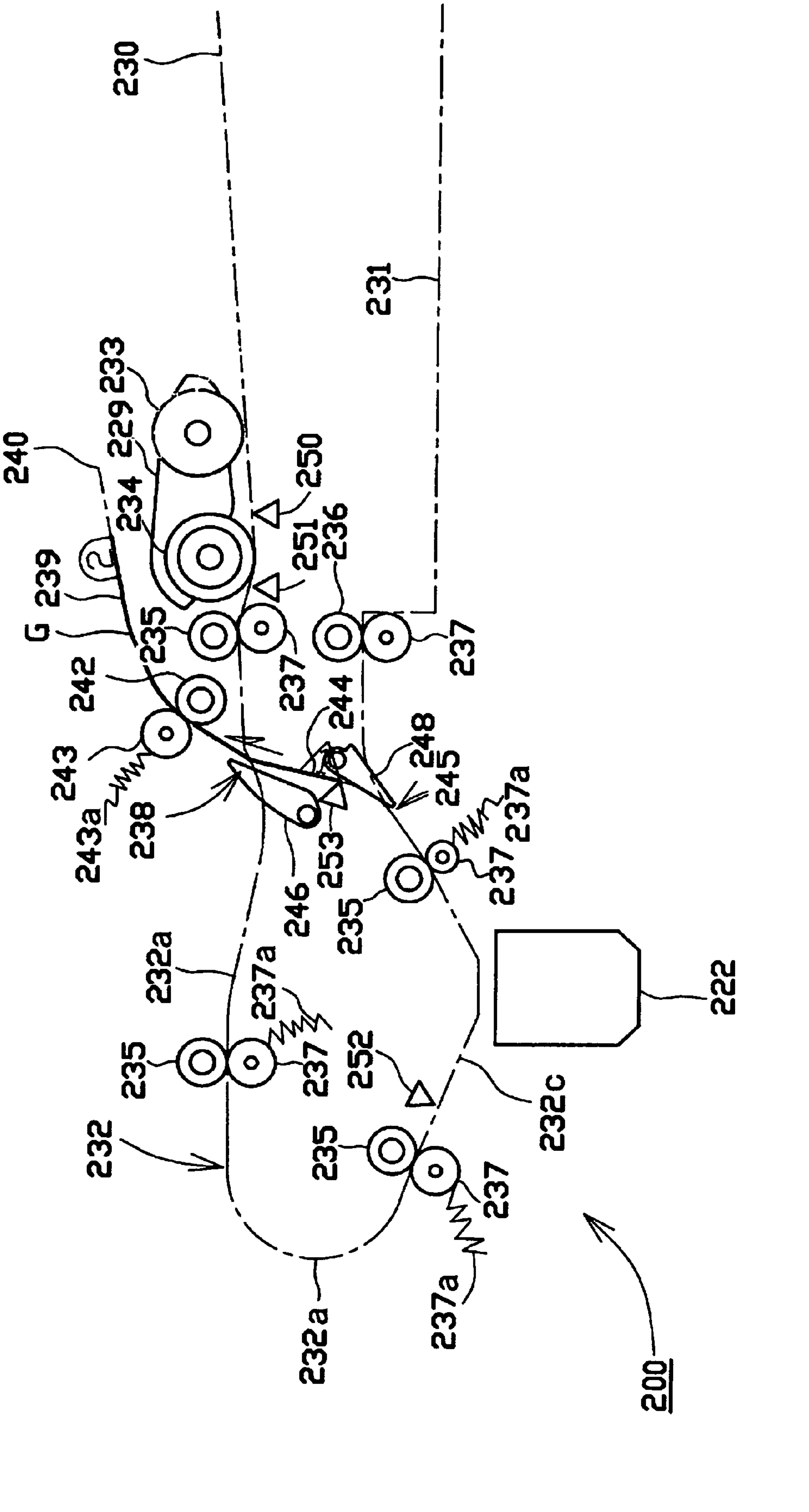

As shown in FIG. 17, the document G entering the bypass 244 comes in contact with the guide flap 246, pushes it upward, and goes to the bidirectional feed path 239 at the first branch position 238. That is, the guide flap 246 guides the document G at the first branch position 238 to go from the bypass 244 to the bidirectional feed path 239.

As the bypass 244 and the bidirectional feed path 239 are connected smoothly in generally a straight line, the document G goes to the bidirectional feed path 239 at the first branch position 238, without going to the output tray 231 of the feed path 232. At this time, the document G is nipped between the reversible roller 242 and the pinch roller 243, and fed via the directional feed path 239 toward the bidirectional feed ejection opening 240 along with the rotation of the reversible roller 242.

After the document G completely goes to the bidirectional feed path 239, the reversible roller 242 is stopped.

As shown in FIG. 17, the trailing end of the document G passes the first branch position 238 when a specified time passes after the trailing end of the document G being fed in the bypass 244 is detected by the bidirectional feed sensor 253. Thus, a determination as to whether the document G completely goes to the bidirectional feed path 239 is made by counting a detection signal by the bidirectional feed sensor 253, and a feeding length or time by the feed rollers 235.

Figure 18:
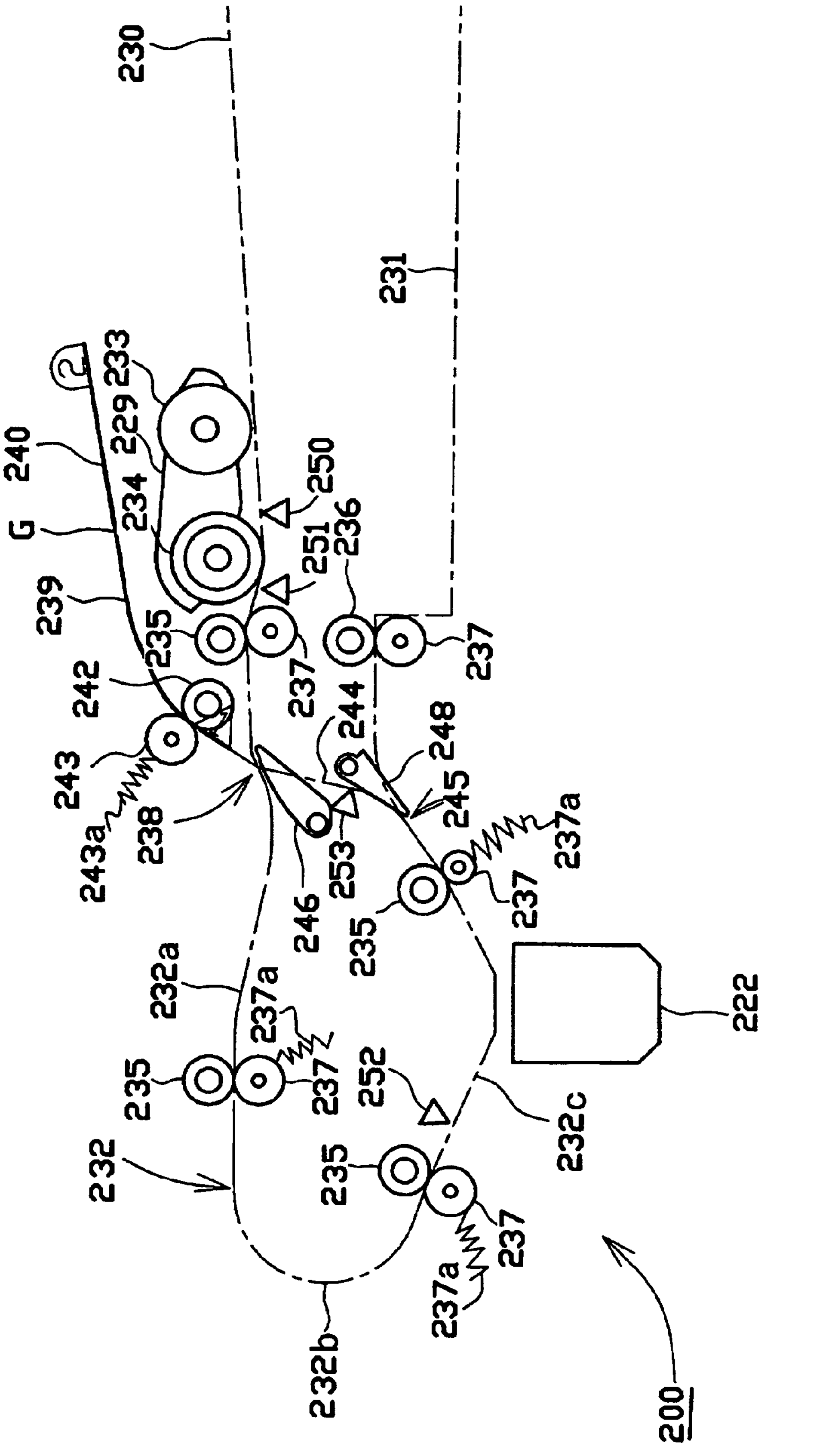

Then, the reversible roller 242 is stopped, and the document G is stopped while still remaining nipped between the reversible roller 242 and the pinch roller 243 as shown in FIG. 18. At this time, although a part of the document G protrudes from the bidirectional feed ejection opening 240 of the bidirectional feed path 239 outside of the ADF 201, it is supported by the document supporting part 241.

As the document G passes over the first branch position 238 and separates from the guide flap 246, the guide flap 246 pivots downward and continues from the bidirectional feed path 239 to the upstream side of the reading position of the feed path 232 at the first branch position 238. Then, the reversible roller 242 is rotated backward, so that the document G is fed back to the feed path 232 from the bidirectional feed path 39.

Figure 19:
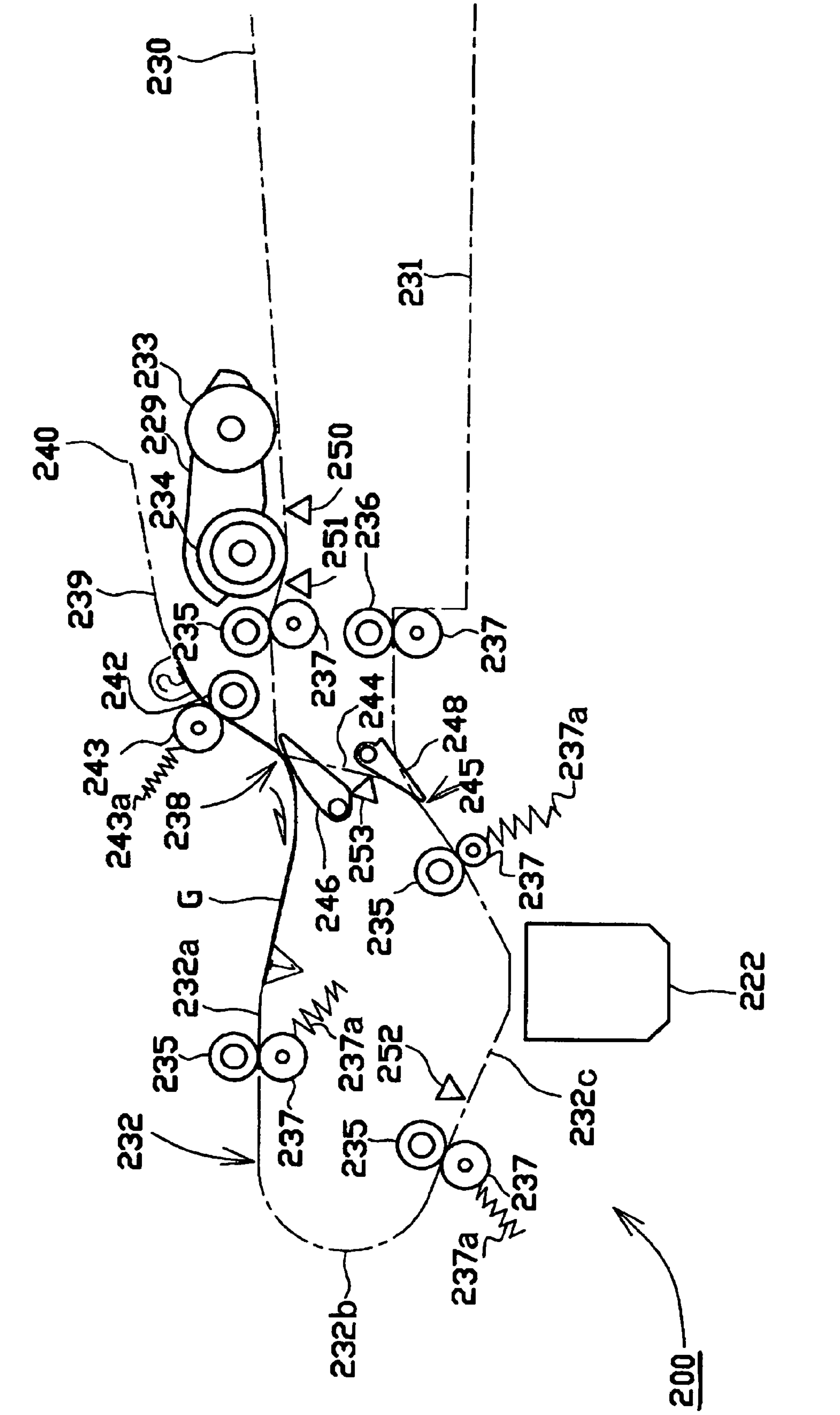

As shown in FIG. 19, the feed path toward the bypass 244 is closed by the guide flap 246. Thus, the document G the document G being fed back from the bidirectional feed path 239 is guided at the first branch position 238 by the guide flap 246 to go to the upstream side of the reading position of the feed path 232.

As the feed path from the bidirectional feed path 239 to the output tray 230 of the feed path 232 is sharply bent more than the feed path from the bidirectional feed path 239 to the upstream side of the reading position of the feed path 232, the document G being fed back from the bidirectional feed path 239 does not go to the output tray 231 of the feed path 232 at the first branch position 238.

Thus, when the document G is fed back to the feed path 232 from the bidirectional feed path 239, it is fed back again to the document feed path 232 with its leading end and trailing end reversed as compared with the condition where the document G was first fed into the document feed path 232. Thus, the document G is fed into the document feed path 232 with its back side facing the reading position.

Figure 20:
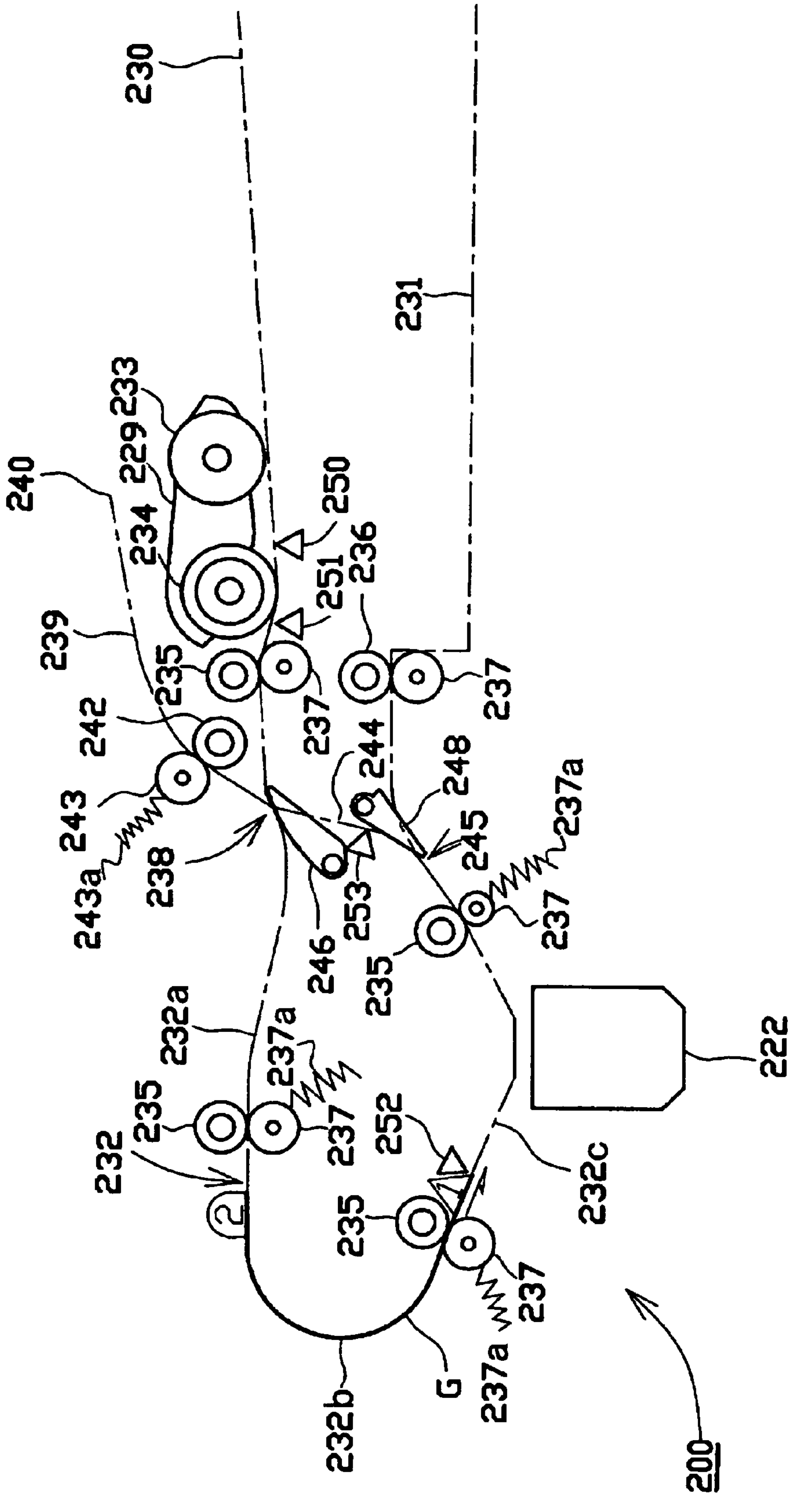
Figure 21:
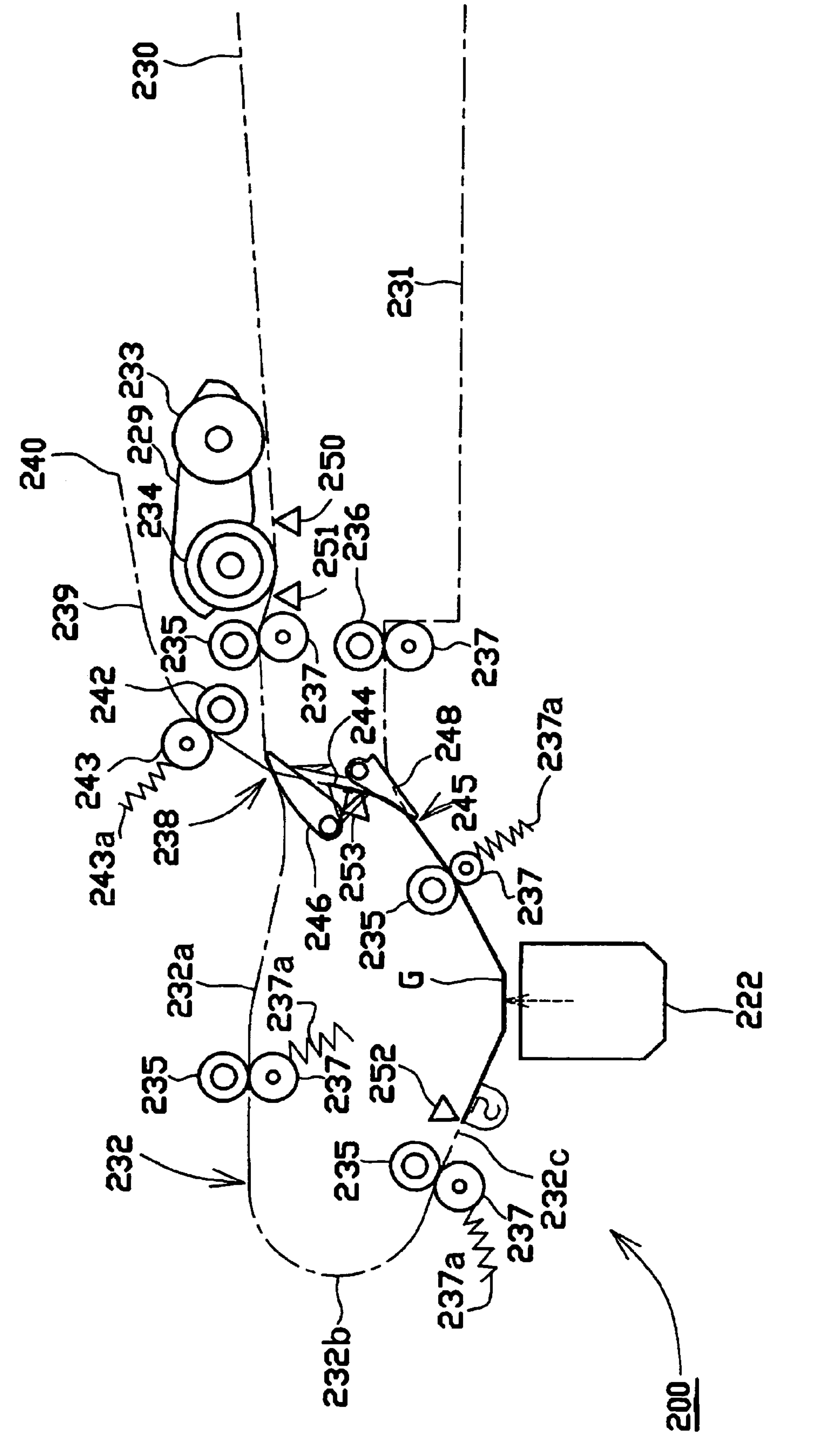

As shown in FIG. 20, when the leading end of the document G is detected by the rear sensor 252 and reaches the reading position, the image reading unit 222 starts image reading of the back side of the document G as shown in FIG. 21.

The document G of which the back side has been read then is guided by the guide flap 248, and it enters the bypass 244 from the feed path 232 at the second branch position 245. When the trailing end of the document G is detected by the rear sensor 252 and reaches the reading position, the image reading unit 222 finishes image reading of the document G.

Figure 22:
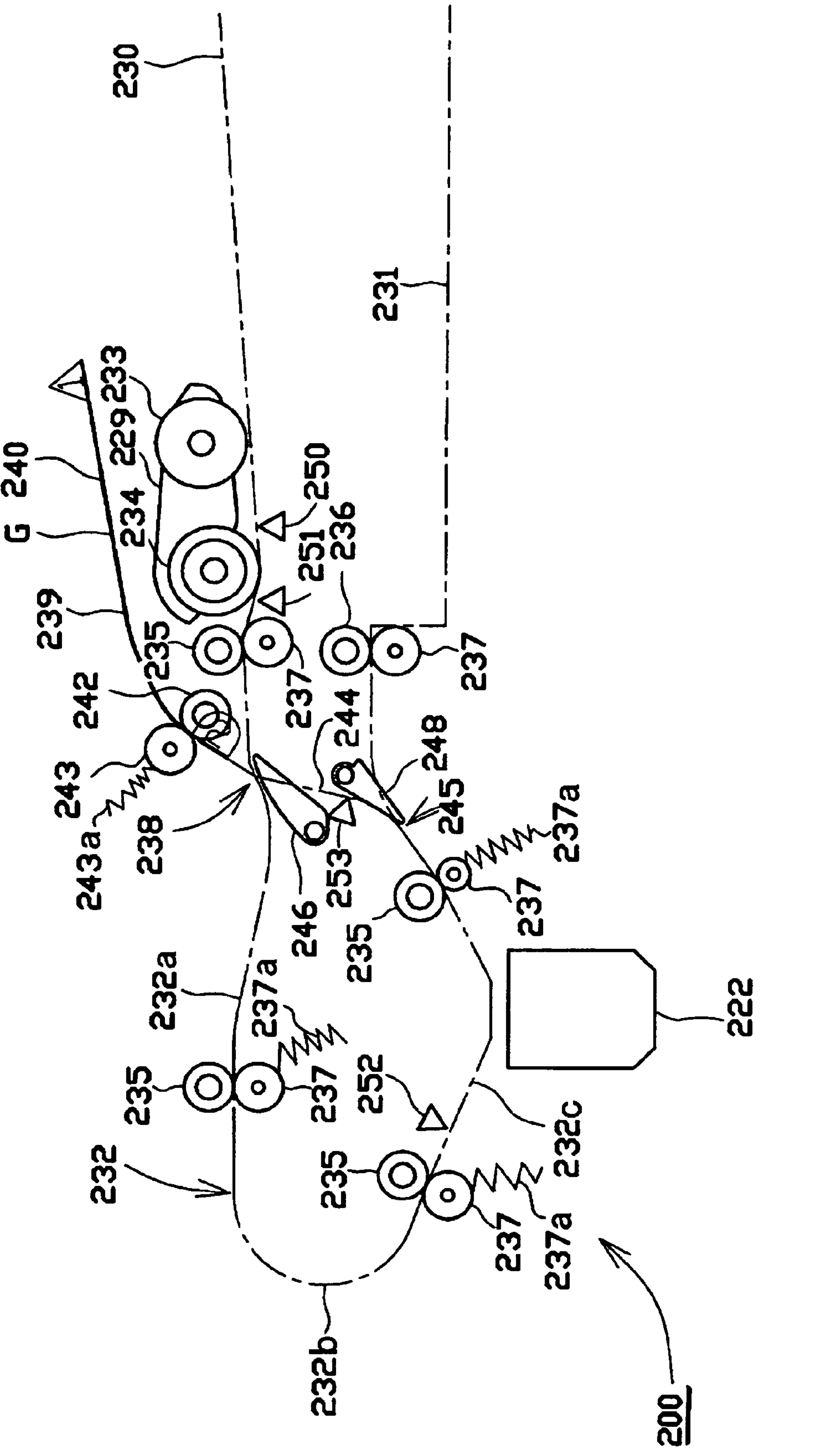

The document G entering the bypass 244 pushes the guide flap 246 upward, and goes from the bypass 244 to the bidirectional feed path 239 at the first branch position 238. As shown in FIG. 22, after the document G completely goes to the bidirectional feed path 239, the reversible roller 242 stops.

When the document G passes, the guide flap 246 returns to the position so that it continues the feed path at the first branch position 238 from bidirectional feed path 239 to the reading position of the feed path 232. Then, the reversible roller 242 is rotated backward, the document is fed back to the feed path 232 from the bidirectional feed path 239 with its leading end and trailing end reversed again.

Figure 23:
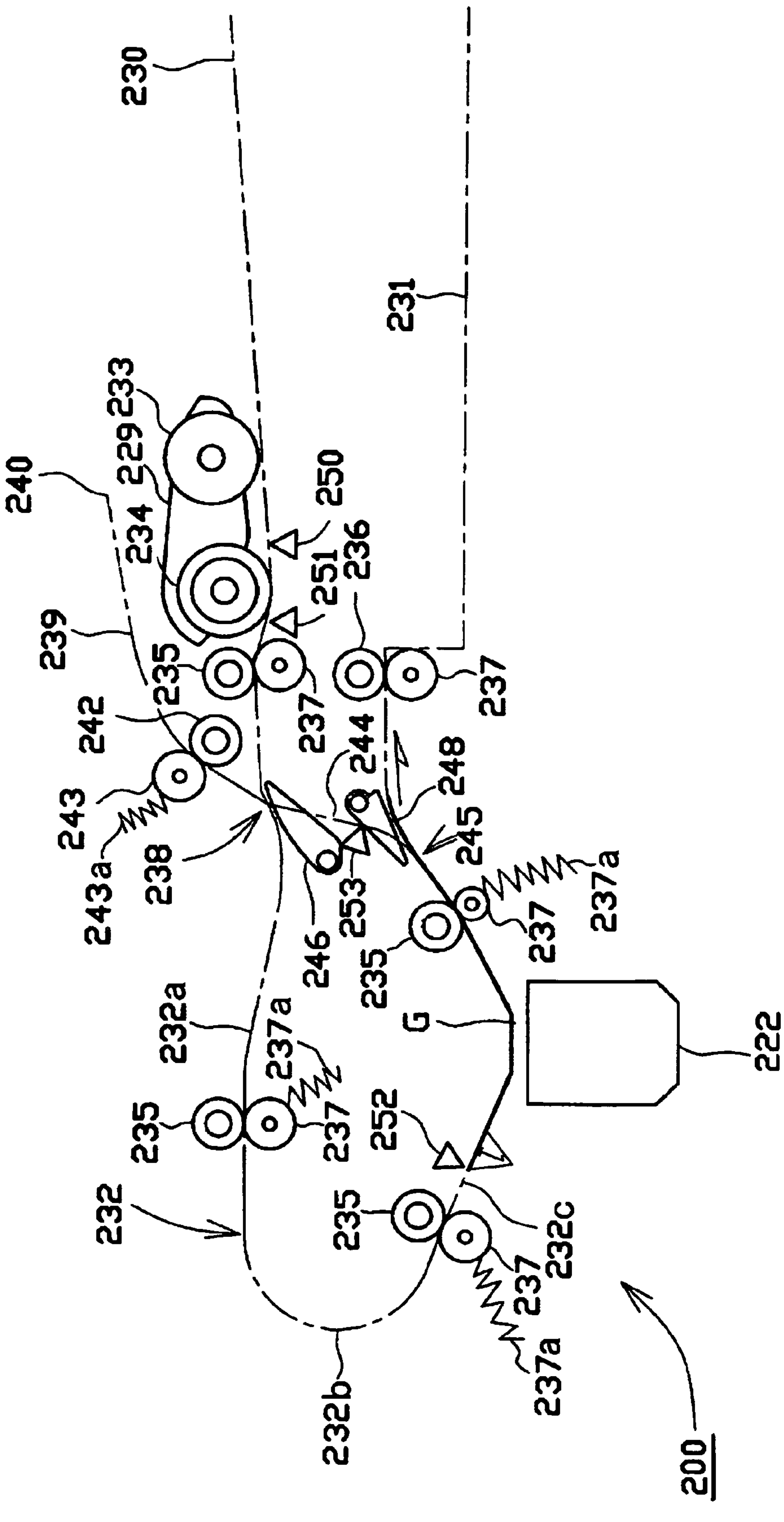

After the document G reaches between the first branch position 238 and the second branch position 245 of the feed path 232, the guide flap 248 switches the feed path at the second branch position 245 from the reading position side of the feed path 232 to the output tray 231 side. Thus, as shown in FIG. 23, the document G is guided at the second branch position 245 by the guide flap 248 to go to the output tray 231 side of the feed path 232, and is ejected to the output tray 231 with its front side face down.

When the following document G is set on the input tray 230, it is singly picked up and fed from the input tray 230, and image reading of both surfaces of the document G is performed by repeating the above operations. As documents G are sequentially ejected to the output tray 231 with their front side face down, the order of the documents G placed on the input tray 230 is maintained on the output tray 231.

As apparent from the above description, the document G is fed in the side-to-side direction of the image forming apparatus 1, or in a direction perpendicular to the feeding direction in the image forming part 100.

Features of Illustrative Aspects of the Image Forming Apparatus

In the auto feed reading part having an ADF 201, images printed on both front and back sides of a document are read while the feeding direction of the document is controlled. The width of the auto feed reading part, that is, the dimension of a direction that is perpendicular to both the feeding direction and the thickness of a document is sufficient to accommodate the width of a document plus the size of a mechanism for feeding the document. On the contrary, since the stationary reading part reads an image printed on a stationary document placed on the platen 220, the plane dimensions are greater than those of the document. Thus, the plane dimensions of the stationary reading part are normally greater than those of the auto feed reading part.

The image reading apparatus, having the stationary reading part and the auto feed reading part, includes a part parallel to the longest side of a document. The size of this parallel part corresponds to the dimension of the longest side of a maximum readable document plus the dimensions of the auto feed reading part. This size is the maximum plane dimensions of the image reading apparatus and it is structurally difficult to develop a smaller version of the image reading apparatus.

In the image forming part 100, an image is formed while a recording medium is fed in the direction perpendicular to the feeding direction. Thus, the width of the image forming part 100 reaches a size including the width of a recording medium and the size of a drive mechanism such as a gear for feeding the recording medium. This size is the maximum plane dimensions of the image reading apparatus and is structurally hard to develop a smaller version of the image reading apparatus.

Thus, if the feeding direction of a document in the image reading apparatus having the stationary reading part and the auto feed reading part is parallel to the feeding direction of a recording medium in the image forming part, the plane dimensions of the image forming apparatus cannot be made smaller and downsizing is difficult.

Contrary to this, as apparent from FIGS. 4 and 6, the image reading part 200 and the image forming part 100 are disposed so that the feeding direction of a document in the image reading part 200 and the feeding direction of a recording medium in the image forming part 100 are generally perpendicular to each other. Thus, a portion corresponding to the width of the image forming part 100 becomes the maximum plane dimensions of the image reading part 200.

Thus, a portion where downsizing is difficult in the image forming part 100 and a portion where downsizing is difficult in the image reading part 200 overlap. Although downsizing the image forming apparatus 1 in the longest direction of the plane dimensions is difficult, the other directions facilitate downsizing.

In other words, if the feeding direction of a document in the image reading part 200 including the stationary reading part and the auto feed reading part is parallel to the feeding direction of a recording medium in the image forming part 100, downsizing is difficult in any direction. However, when the feeding direction of a document in the image reading part 200 is perpendicular to the feeding direction of a recording medium in the image forming part 100 as in the illustrative embodiment, the other directions facilitate downsizing easier compared with the longest direction of the plane dimensions. Thus, upsizing of the image forming apparatus 1 can be prevented.

The opening 310 of the placement space 300 and the operation panel 500 are provided on the same side (front side). The user consequently works on the front side where the opening 310 and the operation panel 500 are provided.

As is evident from FIGS. 4 and 6, when the image forming apparatus 1 is viewed from the top, the feeding direction in the ADF 201 is perpendicular to the feeding direction in the image forming part 100. Thus, when a document is ejected for reversal of the feeding direction, the document is not ejected toward the user.

Thus, the user can be prevented from erroneously assuming that the image formation is completed, and the ejected document may not be erroneously picked up.

The bidirectional feed opening 240 is disposed above the input tray 230. Thus, when a document is ejected from the opening 240 for the reversal of the feeding direction, the input tray 230 is out of the way.

As shown in FIGS. 4 and 5, the length L from the outlet 107 to the opening 310 is longer than the length of the maximum sized recording medium that is capable of being stored in the image forming part 100 (the input tray 21). Thus, when the feeding direction of a recording medium whose front side has been read is reversed, the recording medium is ejected toward the user (toward the opening 310) but does not protrude outside the image forming apparatus 1.

Thus, even when the recording medium is ejected toward the user during the reversal of the feeding direction, the recording medium is visually obstructed, thereby preventing the user from erroneously assuming that the image formation is completed. Thus, the ejected recording medium may not be erroneously picked up.

The spring 243*a* that urges the pinch roller 243 toward the reversible roller 242 generates a smaller pressing force than that of the spring 237*a* that urges the pinch roller 237 toward the feeding roller 235. The feeding rollers 235 and the pinch rollers 237, which are disposed on both sides of the document holding member 221*a* with respect to the feeding direction, can apply a specified tension to a document on the platen 221, and can also reduce friction between the reversible roller 242 and the document, compared with friction between the document and the feeding rollers 235, which are disposed on both sides of the document holding member 221a with respect to the feeding direction.

Thus, in the illustrative embodiment, a force for nipping the document, which is ejected for the reversal of the feeding direction, becomes small. If it is unnecessary to scan the backside of a document during document reading and the document may need to be picked up forcefully. In this case, the user can easily pick up the document, which is ejected for the reversal of the feeding direction, by holding it.

By reducing the pressing force of the spring 243a, the friction between the reversible roller 242 and the document is reduced. If a coefficient of friction of the reversible roller 242 and a coefficient of friction of the feeding roller 235 are set equal, the friction between the reversible roller 242 and the document can be set smaller than friction between the feeding roller 235 and the document.

With this feature, the reversible roller 242 and the feeding roller 235 can be shared or the rollers 242 and 235 can be made of the same material. Thus, the manufacturing cost of the image forming apparatus 1 can be reduced.

The document of which image has been completely read is ejected to the output tray 231 disposed below the input tray 230. However, when the size of the document is small, the document cover 203 and the input tray 230 may become obstacles, making it difficult to pick up the document ejected to the output tray 231.

Thus, the document cover 203 may be provided with the cutout portion 260 on the side surface in this illustrative embodiment, and it is thus possible to pick up the document ejected to the output tray 231 via the cutout portion 260. Thus, even small document can be easily picked up.

The sidewall portion 231a of the output tray 231 has an inclined surface smoothly continuing from the bottom surface portion 231b. Even when a document ejected to the output tray 231 is small, the document can be easily picked up by pulling out the document along the inclined surface continuing from the bottom surface portion 231b.

The recessed portion 302, which is recessed downward from the bottom surface portion 301 defining the placement space 300, is provided in the lower outer edge of the opening 310, so that the user can insert his/her fingers beneath the recording medium placed in the placement space 300. Thus, the recording medium placed in the placement space 300 can be easily picked up.

Outer edges defining the opening 310 and an outer wall of the image forming part 100 are flush with each other as shown in FIG. 3 when viewed from a side of the image forming apparatus 1 providing an image forming apparatus 1 with a good design.

In the above illustrative embodiment, the image forming part 100 is an electrophotographic image forming apparatus. However, the image forming part 100 may be an inkjet type image forming apparatus.

In the above illustrative embodiment, by reducing the elastic force of the spring 243a more than the elastic force of the spring 237a, so that the friction between the reversible roller 242 and the document is set lower than the friction between the document and the feeding rollers 235, which are disposed on both sides of the document holding member 221a with respect to the feeding direction. However, other settings may be used. For example, the friction between the reversible roller 242 and the document may be set low by reducing the coefficient of friction of the reversible roller 242 more than the coefficient of friction of the feeding roller 235.

While the various aspects of the invention have been described in conjunction with the example structures and methods described above, various alternatives, modifications, variations, improvements and/or substantial equivalents, whether known or that are or may be presently unforeseen, may become apparent to those having at least ordinary skill in the art. Accordingly, the example structures and methods, as set forth above, are intended to be illustrative of the invention, not limiting it. Various changes may be made without departing from the spirit and scope of the invention. Therefore, the invention is intended to embrace all known or later developed alternatives, modifications, variations, improvements and/or substantial equivalents.

What is claimed is:

1. An image forming apparatus comprising:

a first unit, the first unit comprising:

a first casing having a front end and an outlet, a storing member configured to store a recording medium, a recording part configured to form an image on the recording medium, an ejecting unit configured to eject the recording medium between the first unit and a second unit in a first direction through the outlet, a first feeding unit configured to feed the recording medium from the storing member to the recording part, and a first reversing unit configured to reverse the recording medium upside-down and feed the recording medium again to the recording part, and the second unit disposed above the first unit, the second unit including a second casing, a first reading part configured to move in a second direction perpendicular to the first direction, a second reading part, a second feeding unit configured to feed a document to the second reading part in a third direction perpendicular to the first direction, and a second reversing unit configured to reverse the document upside-down and feed the document again to the second reading part, wherein a length from the front end of the first unit to the outlet is greater than or equal to a maximum length of the recording medium in the first direction capable of being stored in the storing member.

2. The image forming apparatus according to claim 1, further comprising a joint part that connects the first unit and the second unit.

3. The image forming apparatus according to claim 1, wherein the second casing has an opening that communicates with the second reversing unit for allowing at least a part of the document to protrude outside the second reading part while reversing the document.

4. The image forming apparatus according to claim 3, further comprising:

a feeding roller configured to feed the document under a tension; and a reversible roller disposed proximate to the opening, the reversible roller configured to rotate both in a forward direction and a reverse direction, wherein a frictional force generated between the reversible roller and the document is lower than a frictional force generated between the feeding roller and the document.

5. The image forming apparatus according to claim 4,
wherein a pressing force of the reversible roller against the document is lower than a pressing force of the feeding roller against the document.

6. The image forming apparatus according to claim 1, wherein the second unit comprises a control panel.

7. The image forming apparatus according to claim 1, wherein an edge of the outlet on the front end of the first casing is on a flat plane.

8. The image formation apparatus according to claim 1,
wherein the second unit further comprises a tray configured to catch the document ejected from the second reading part, and
wherein the second casing has a cutout portion at a side nearer to the front end of the first casing.

9. An image forming apparatus comprising:
a first unit, the first unit comprising:
a first casing having a front end and an outlet,
a storing member configured to store a recording medium,
a recording part configured to form an image on the recording medium,
an ejecting unit configured to eject the recording medium between the first unit and a second unit in a first direction through the outlet,
a first feeding unit configured to feed the recording medium from the storing member to the recording part, and
a first reversing unit configured to reverse the recording medium upside-down and feed the recording medium again to the recording part, and
the second unit disposed above the first unit, the second unit including
a second casing,
a first reading part configured to move in a second direction perpendicular to the first direction,
a second reading part,
a second feeding unit configured to feed a document to the second reading part in a third direction perpendicular to the first direction, and
a second reversing unit configured to reverse the document upside-down and feed the document again to the second reading part,
wherein an edge of the outlet on the front end of the first casing is on a flat plane.

10. The image forming apparatus according to claim 9, further comprising a joint part that connects the first unit and the second unit.

11. The image forming apparatus according to claim 9, wherein the second casing has an opening that communicates with the second reversing unit for allowing at least a part of the document to protrude outside the second reading part while reversing the document.

12. The image forming apparatus according to claim 9,
wherein the second unit further comprises a tray configured to catch the document ejected from the second reading part, and
wherein the second casing has a cutout portion at a side nearer to the front end of the first casing.

* * * * *